(12) United States Patent
Li et al.

(10) Patent No.: US 6,775,332 B1
(45) Date of Patent: Aug. 10, 2004

(54) MULTI-STAGE RECEIVER

(75) Inventors: Bin Li, Ottawa (CA); Wen Tong, Ottawa (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 10/435,799

(22) Filed: May 12, 2003

Related U.S. Application Data

(63) Continuation of application No. 09/311,708, filed on May 13, 1999, now Pat. No. 6,587,517, which is a continuation-in-part of application No. 09/220,014, filed on Dec. 23, 1998, now Pat. No. 6,526,103.

(51) Int. Cl.$^7$ ................................................. H03K 9/00
(52) U.S. Cl. ..................................... 375/316; 375/347
(58) Field of Search .............................. 375/316, 346, 375/347, 349, 340, 130; 370/342, 335, 329, 331; 714/794, 780; 455/132, 137, 246.1

(56) References Cited

U.S. PATENT DOCUMENTS

| | | | | |
|---|---|---|---|---|
| 5,329,547 A | * | 7/1994 | Ling ........................... | 370/342 |
| 5,657,348 A | * | 8/1997 | Ericsson et al. ............. | 375/227 |
| 5,659,573 A | * | 8/1997 | Bruckert et al. ............. | 375/142 |
| 6,327,315 B1 | * | 12/2001 | Piirainen ..................... | 375/340 |
| 6,526,103 B1 | * | 2/2003 | Li et al. ...................... | 375/316 |
| 6,587,517 B1 | * | 7/2003 | Li et al. ...................... | 375/316 |

* cited by examiner

*Primary Examiner*—Khai Tran

(57) ABSTRACT

A multi-stage receiver and method for recovering a traffic signal embedded in at least one received signal. The multi-stage receiver includes a plurality of sequential detection stages for processing each received signal and providing successively better estimates of the traffic signal. The multi-stage receiver includes, for each received signal, a first processing stage and a second processing stage. The multi-stage receiver also includes a final processing stage connected to the second processing stages. Each first processing stage generates a first estimate of the traffic signal from the respective received signal and each second processing stage generates a set of energy values from the respective first estimate of the traffic signal and from the respective received signal. The final processing stage combines the set of energy values from each second processing stage and generates an improved estimate of the traffic signal. By employing multiple stages in the receiver, there is an improvement in successive estimates of the traffic signal.

7 Claims, 13 Drawing Sheets

MULTI-STAGE RECEIVER

CROSS REFERENCES TO RELATED APPLICATIONS

The present application is a continuation of U.S. patent application Ser. No. 09/311,708 to Li et al., filed on May 13, 1999, now U.S. Pat. No. 6,587,547, which is a continuation-in-part of U.S. patent application Ser. No. 09/220,014 to Li et al., filed on Dec. 23, 1998, now U.S. Pat. No. 6,526,103, both of which are hereby incorporated by reference herein.

RELATED APPLICATION

This application is a Continuation-in-Part of copending application Ser. No. 09/220,014 entitled "A Multi-Stage Receiver", filed on Dec. 23, 1998 by Bin Li and Weng Tong and assigned to the assignee of the present application.

FIELD OF THE INVENTION

The present invention relates to receiving signals in a radio communications systems and particularly, but not exclusively, in a spread-spectrum communications system.

BACKGROUND OF THE INVENTION

In a typical wireless communication system, a plurality of mobile stations is accommodated. Typically, more than one mobile station utilizes the wireless communications system at any given time. Such a communications system is sometimes called a multiple access communications system.

Radio frequency (RF) signals are used in multiple access communication systems to carry traffic between the mobile stations and base stations. With the enormous and ever increasing popularity of multiple access communications systems (e.g. cellular phone communications systems), the RF spectrum has become a very scarce resource. As a result, it is more and more important for service providers of multiple access communication systems to efficiently use the RF spectrum allocated to them and to maximize the capacity of the multiple access communications systems to carry traffic.

Many different techniques which allow multiple mobile stations to access a multiple access communications system simultaneously have been utilized such as time-division multiple access (TDMA), frequency-division multiple access (FDMA) and code-division multiple access (CDMA). CDMA utilizes spread-spectrum modulation techniques which have certain advantages over TDMA and FDMA. Many new communications systems employed today utilize CDMA. The use of CDMA in a multiple access communications system is disclosed in U.S. Pat. No. 4,901,307 entitled "Spread-Spectrum Multiple Access Communications System Using Satellite or Terrestrial Repeaters" and issued to Qualcomm Incorporated on Feb. 13, 1993. This patent is incorporated by reference herein in its entirety.

A typical multiple access communications system which utilizes CDMA (a "CDMA Communications System") has not only a plurality of mobile stations but also a plurality of base stations with which the mobile stations communicate. In addition, a typical CDMA communications system has at least one forward CDMA channel and at least one reverse CDMA channel. Each forward CDMA channel and each reverse CDMA channel is assigned a unique non-overlapping frequency band. Typically, there is a guard frequency band between the frequency band(s) used by the forward channel(s) and the frequency band(s) used by the reverse channel(s).

Communications from the base stations to the mobile stations are carried in the forward CDMA channel(s). Each forward CDMA channel is composed of a plurality of code channels. The code channels share the frequency band assigned to the respective forward CDMA channel using spread-spectrum modulation techniques. Each mobile station is associated with a unique code channel.

Similarly, communications from the mobile stations to the base stations are carried in the reverse CDMA channel(s). Each reverse CDMA channel is composed of a plurality of code channels, typically called access channels and reverse traffic channels. The code channels share the frequency band assigned to the respective reverse CDMA channel using spread spectrum modulation techniques. Each mobile station is associated with a unique reverse traffic channel. The access channels are typically used to page or notify the base stations of outgoing calls.

In CDMA communications systems defined by ANSI Standard J-STD-008 or TIA/EIA Standard IS-95A, which are incorporated by reference herein, each frequency band utilized by the forward CDMA channel(s) and the reverse CDMA channel(s) is 1.23 MHZ wide. In addition, each forward CDMA channel and each reverse CDMA channel is further divided into 64 code channels.

In a CDMA communications system, the base stations may be satellites circulating the globe or stations located on the ground ("terrestrial base stations") or both. At the UHF or higher frequency bands commonly used by CDMA communications systems, a signal from a mobile station commonly arrives at a base station via a plurality of different paths. (i.e. a plurality of signals are commonly received at the base station for each signal sent from the mobile station). Similarly, a signal from a base station directed to a mobile station commonly arrives at the mobile station via a plurality of different paths.

The time it takes (typically called a path delay) for a signal to arrive at its intended destination is commonly different for each path. Moreover, significant phase differences between the signals travelling on different paths may occur especially at the UHF or higher frequency bands. In other words, signals may arrive at a base station from a mobile station (or at a mobile station from a base station) from many different directions or paths, each with a different path delay and phase. When signals are received at each base station and each mobile station, destructive summation of the signals may occur with on occasion deep fading. Such multipath fading is common at the UHF or higher frequency bands.

Multipath fading on the signals between the satellites and the mobile stations is not usually as severe as the multipath fading on the signals between the terrestrial base stations and the mobile stations. Since the satellites are normally located in the geosynchronous earth orbit, the distances between mobile stations and any given satellite are relatively the same. In addition, if a mobile station changes location, the distance between the mobile station and a satellite does not change significantly. In contrast, the distances between the mobile stations and the terrestrial base stations can vary quite significantly. One mobile station may be a few hundred feet away from a terrestrial base station and another mobile station may be miles away from the same base station. In addition, if a mobile station changes position, the distance between the mobile station and the terrestrial base station may change significantly. Consequently, the change in the position of the mobile station may change the path delays and phases of all of the signals carried on the respective paths between the mobile station and the terrestrial base station.

In light of the above, signals between the satellites and the mobile stations typically experience fading that is characterized as Rician Fading. In contrast, signals between the terrestrial base stations and the mobile stations typically experience more severe fading that is characterized as Rayleigh Fading. The Rayleigh fading is due, in part, by the signals being reflected from a plurality of objects (e.g. buildings) between the mobile stations and the base stations.

Since a CDMA communications system utilizes a wide band signal in each forward CDMA channel and in each reverse CDMA channel, multipath fading typically only affects a small part of each wide band signal. In other words, CDMA by its inherent nature uses a form of frequency diversity to mitigate the deleterious affects of multipath fading.

In addition to frequency diversity, CDMA communications systems commonly use time diversity and space (or path) diversity to mitigate the deleterious affects of multipath fading. Time diversity is commonly employed through the use of repetition, time interleaving and error detection and correction decoding schemes. Space diversity is commonly employed in the reverse CDMA channel(s) through the use simultaneous communication links from each mobile station to a base station employing a plurality of antennas. Each antenna services one of the simultaneous communication links. Space diversity is also commonly employed in the forward CDMA channel(s) and in the reverse CDMA channel(s) by exploiting the unique characteristics of the spread-spectrum signals used by CDMA communications systems.

Many CDMA communications systems, such as CDMA communications systems defined by the IS-95A standard ("IS-95 CDMA Communications Systems"), modulate the traffic carried in each code channel using high speed pseudo-random noise (PN) modulation techniques at a PN chip rate. Each code channel within a reverse CDMA channel is assigned and modulated with a unique PN code to generate PN sequences (containing the traffic). The high speed PN modulation allows many different paths to be separated provided the difference in path delays exceeds the inverse of the PN chip rate, typically called a PN chip duration.

However, the PN codes and the resulting sequences are not orthogonal. For short time intervals (e.g. an information bit), the cross correlations between different PN codes and the cross correlations between different PN sequences are random with a binomial distribution. Consequently, the traffic carried in each code channel typically interferes with the traffic carried in other code channels. To reduce the mutual interference and allow higher system capacity, many CDMA communications systems also modulate the traffic carried in each code channel with orthogonal binary sequences, such as Walsh codes, from a set of a fixed number of mutually orthogonal binary sequences. Each orthogonal binary sequence has a corresponding index symbol. For example, in an IS-95 CDMA communications system, 64 different Walsh codes are used. Consequently, every six bits of data traffic corresponds to one of the index symbols and are mapped to one of the 64 Walsh codes. The use of Walsh codes reduces the mutual interference and increases the system capacity to carry traffic.

The base stations typically send in each forward CDMA channel, one or more pilot signals which are used by receivers in the mobile stations to coherently demodulate the traffic carried in the forward CDMA channels. The pilot signals provide channel information relating to amplitude changes (i.e. fading) and phase changes. However, due to power considerations, the mobile stations do not typically send a pilot signal to the base stations. Such is the case in IS-95A CDMA communications systems. Consequently, receivers at the base stations must typically use non-coherent demodulation techniques to demodulate or detect the traffic sent in the reverse traffic channels within each reverse CDMA channel.

Since it is more difficult to demodulate traffic using non-coherent demodulation techniques than using coherent demodulation techniques, the capacity of many CDMA communications systems to handle traffic is limited by the ability of the receivers at the base station to detect, error-free, the traffic carried in the reverse traffic channels (within each reverse CDMA channel) using non-coherent demodulation techniques. Consequently, the capacity of many CDMA communications systems is limited by the performance of the receivers used at the base stations.

Each base station has at least one receiver with at least one antenna. Since each receiver typically services only one mobile station at a time, each base station typically has a plurality of receivers, one for each mobile station to be serviced simultaneously. Each receiver at the base station typically has a receiver section, a detector section and a decoder section.

A conventional approach used to maximize the performance of the receivers at the base stations is to optimize separately the detector section and the decoder section of each receiver.

With many CDMA communications systems, the mobile stations first encode the data bits of the traffic to data symbols at a fixed encoding rate using an encoding algorithm which facilitates subsequent maximum likelihood decoding of the data symbols into data bits by a decoder in the decoder section. Furthermore, the mobile stations also typically interleave the data symbols using an interleaver to generate interleaved data symbols. The interleaving of the data symbols helps reduce the deleterious effects of multipath fading and improve the performance of the decoder section.

The mobile stations then map (or encode) the interleaved data symbols (containing the traffic) into orthogonal codes from a set of mutually orthogonal codes, such as Walsh codes. The use of orthogonal codes facilitates the detection of each data symbol carried in respective code channel by the detector and decoder sections of the receiver at the base station.

For each antenna at a base station, a single maxima receiver or a dual maxima receiver is commonly used. Each single maxima receiver and each dual maxima receiver commonly uses a rake receiver design. Such a design has two or more fingers, each finger being used for receiving and detecting signals carried on one of the paths.

Referring to FIGS. 2 and 3, a single maxima receiver 300 of the rake receiver design consists of an antenna 310, a receiver section 320, a detector section 330 and a decoder section 340. (Alternatively, more than one antenna 310 may be used for space or path diversity reception). The receiver section 320 is connected to the antenna 310 and to the detector section 330. The decoder section 340 is connected to the demodulator section 330.

The receiver section 320 consists of one receiver subsection. (If more than one antenna 310 is used, multiple receiver subsections would be employed, one for each antenna 310). Each receiver subsection consists of a searcher receiver and three data receivers. More or less than three data receivers can be used. (However, each receiver section must have one searcher receiver and at least one data receiver). For each RF signal sent by the mobile station, the searcher receiver searches the received spread-spectrum RF signals arriving via the various reverse paths at the antenna 310 for the strongest spread-spectrum RF signals associated with the mobile station. The searcher receiver then instructs the data receivers to track and receive the RF signals carried in the reverse paths with the strongest levels. Each data receiver typically receives and tracks a separate RF signal. In particular, each data receiver demodulates the respective spread-spectrum RF signal and translates the respective spread-spectrum RF signal from the RF frequency to a processed received signal at a lower frequency. Furthermore, each data receiver samples at the PN chip rate (e.g. 1.2288 msamples/sec) the respective processed received signal to generate respective data samples 325A, 325B and 325C for the detector section 330 of the receiver 300.

The detector section 330 of the single maxima receiver 300 consists of three detector subsections, a first subsection 400A, a second subsection 400B and a third subsection 400C. Each subsection 400A–C is associated with one of the data receivers in the receiver section 320. The combination of each data receiver with its corresponding subsection 400A–C is commonly called a finger of the single maxima receiver 300 (using rake receiver terminology). If more data receivers are employed (or if more receiver subsections are employed), then a corresponding additional number of detector subsections would be employed.

The detector subsection 400A consists of a demodulator 410, a Walsh transformer circuitry 420 and squaring and summing circuitry 430. The Walsh transformer circuitry 420 is connected to the demodulator 410 and to the squaring and summing circuitry 430. The detector subsection 400A typically demodulates groups of samples 325A of the processed received signal into two groups of samples of sub-signals using a demodulator—one group of samples 412 of an in phase signal and one group of samples 414 of a quadrature phase signal. The two groups of samples 412, 414 of sub-signals are transformed into a block of complex transformer output signals 425 using the Walsh transformer circuitry 420. Typically, the Walsh transformer circuitry 420 consists of two fast Hadamard Transformers (FHT) which transform each group of samples 412 of the in phase signal and each group of samples 414 of the quadrature phase signal into two separate blocks of transformer output signals. The two blocks of transformer output signals are commonly represented as one block of complex transformer output signals 425 (i.e. using complex mathematics). A block of complex transformer output signals 425 may be called a transformer block.

Since Walsh codes are typically used in a CDMA communications system, a block of complex transformer output signals 425 is sometimes called a Walsh block. Each row of the block of complex transformer output signals 425 is a complex transformer output signal 425 (comprising one row of transformer output signals associated with the in phase signal and a corresponding row of transformer output signals associated with the quadrature phase signal).

Each block of complex transformer output signals 425 is carried to the squaring and summing circuitry 430 which converts each block of complex transformer output signals 425 into groups of energy values 445A (or decision values). Each energy value 445A within the group of energy values 445A associated with a particular group of samples 325A of the processed received signal represents a measure of confidence that the group of samples 325A of the processed received signal corresponds to a particular orthogonal code with a corresponding index value. Consequently, each row of the block of complex transformer output signals 425 (i.e. each transformer output signal) corresponds to a measure of confidence that a particular group of samples 325A corresponds to a particular orthogonal code from within the set of mutually orthogonal codes. Since each orthogonal code from the set of mutually orthogonal codes has a corresponding index symbol, each energy value 445A has an associated index symbol.

Similarly, the other fingers generate groups of energy values 445B and 445C associated with groups of samples 325B and 325C respectively.

The energy values 445A–C from each finger are fed into the decoder section 340. The decoder section 340 of the receiver 300 attempts to recover the data bits originally sent. The decoder section 340 consists of a summer 500, a single-maxima metric generator 540, a deinterleaver 550 and a decoder 560. The summer 500 is connected to the squaring and summing circuitry 430 is each finger and to the single maxima metric generator 540. The deinterleaver 550 is connected to the single maxima metric generator 540 and to the decoder 560.

Using the summer 500 in the decoder section 340, each group of energy values 445A from the first detector subsection 400A is directly added with other groups of energy values 445B, 445C from the other detector subsections 400B–C in the other fingers according to their associated orthogonal code (or index symbol) to create a group of combined energy values 505. The combined energy value 505 for each index symbol is fed into the single maxima metric generator 540.

Referring in particular to FIG. 3, the single maxima metric generator 540 consists of selector 515, an index mapper 520, a metric computer 525 and a multiplier 530. The selector 515 is connected to the summer 500, to the index mapper 520 and to the metric computer 525. The multiplier 530 is connected to the index mapper 520 and to the metric computer 525. The selector 515 selects the largest combined energy value 518 within each group of combined energy values 505. The largest combined energy value 505 represents the largest measure of confidence that the groups of samples 325A–C of the processed signal corresponds to one of the orthogonal codes (sometimes called the most likely orthogonal code sent by the mobile station). Since each orthogonal code has a corresponding index symbol, the largest combined energy value 518 represents the largest measure of confidence that the groups of samples 325A–C of the received signal corresponds to one of the index symbols. The selector 515 also selects the symbol 517 (or index symbol) associated with the largest combined energy value 518 (i.e. the most likely orthogonal code). The index symbol 517 selected is carried to the index mapper 520 which maps the index symbol 517 into a plurality of "1" and "–1" soft decision bits 522. The largest combined energy value 518 is carried to the metric computer 525 which generates a scaling factor 527. The multiplier 530 then scales the soft decision bits 522 by the scaling factor 527 to produce soft decision data 545. The first bit in the soft decision data 545 represents a measure of confidence of the value of the first digit of index symbol (corresponding to the most likely orthogonal code). In other words, the first bit in the soft decision data 545 represents a measure of confidence of the value of the first digit of the interleaved data symbol actually sent. The second bit in the soft decision data 545 represents a measure of confidence of the value of the second digit of the index symbol (corresponding to the most likely orthogonal code) or the interleaved data symbol actually sent, etc.

The soft decision data 545 is carried to the deinterleaver 550. The deinterleaver 550 deinterleaves the soft decision data 545 generating deinterleaved soft decision data 555. The deinterleaved soft decision data 555 is then carried to a decoder 560 (typically a Viterbi decoder) which decodes the deinterleaved soft decision data 555 into estimated digital traffic data bits 565.

Sometimes the base stations use simple single maxima receivers that do not use the rake receiver design. Such receivers only have one finger.

The method used by a simple single maxima receiver to generate the largest combined energy value $E_k$ for the $k^{th}$ block of N complex transformer output signals $r_{k,1}, \ldots, r_{k,N}$ can be represented mathematically fairly easily as follows:

$$E_k = \max \{|r_{k,1}|^2, |r_{k,2}|^2, \ldots, |r_{k,N}|^2\}$$

where N is the total number of orthogonal codes used.

A single-maxima receiver is disclosed in U.S. Pat. No. 5,109,390 entitled "Diversity Receiver in CDMA Cellular Telephone System" and issued to the Qualcomm Incorporated on Apr. 28, 1992. This patent is incorporated by reference herein in its entirety.

To increase the system capacity, some CDMA communications systems use receivers typically called dual-maxima receivers. Dual-maxima receivers have improved bit error performance than single-maxima receivers. The dual-maxima receiver may or may not use a rake receiver design.

Referring to FIG. 4, a dual-maxima receiver 600 of the rake receiver design consists of an antenna 310', a receiver section 320', a detector section 330' and a decoder section 605. The antenna 310', the receiver section 320', the detector section 330' are identical to the antenna 310, the receiver section 320 and the detector section 330 found in the single maxima receiver 300 and operate in exactly the same way. The detector section 330' has three detector subsection 400A', 400B' and 400C' which are identical to the detector subsection 400A, 400B and 400C found in the single-maxima receiver 300 and operate in exactly the same way.

However, the dual maxima receiver has a different decoder section 605. The decoder section 605 consists of a summer 500', a dual maxima metric generator 610, a deinterleaver 550' and a decoder 560'. The summer 500', the deinterleaver 550' and the decoder 560' are identical to the summer 500, the deinterleaver 550 and the decoder 560 found in the single maxima receiver 300 and operate in exactly the same way. However, the single-maxima metric generator 540 found in the single maxima receiver 300 is replaced with the dual-maxima metric generator 610. The summer 500' is connected to each detector subsection 400A'–C' in the detector section 330' and to the dual-maxima metric generator 610. The deinterleaver 550' is connected to the dual-maxima metric generator 610 and to the decoder 560'.

The receiver section 320' has a searcher receiver and three data receivers. The searcher receiver instructs the data receiver to track and receive the strongest spread-spectrum RF signals associated with the mobile station. Each data receivers receives a separate RF signal. In particular, each receiver demodulates the RF signal and translates the RF signal to a processed received signal. Each data receiver in the receiver section 320' generates groups of samples 325A', 325B' and 325C' respectively of the respective processed received signal for each respective detector subsection 400A', 400B' and 400C'.

Referring in particular to the first finger, the first detector subsection 400A' consists of a demodulator 410', Walsh transformer circuitry 420' and squaring and summing circuitry 430'. The Walsh transformer circuitry 420' is connected to the demodulator 410' and to the squaring and summing circuitry 430'. The demodulator 410' is connected to the receiver section 320'. The demodulator 410', the Walsh transformer circuitry 420' and the squaring and summing circuitry 430' are identical to the demodulator 410, the Walsh transformer circuitry 420 and the squaring and summing circuitry 430 found in the single-maxima receiver 300 shown in FIG. 2 and operate in exactly the same way.

In particular, groups of data samples 325A' are carried to the demodulator 410'. In the same way as previously described with respect to the single-maxima receiver 300, the demodulator 410' and Walsh transformer circuitry 420' transform groups of samples 325A' of the processed received signal into blocks of complex transformer output signals 425', a block of complex transformer output signals for each group of samples 325A' of the processed received signal. Each block of complex transformer output signals 425' is carried to the squaring and summing circuitry 430' which converts each block of complex transformer output signals 425' into a group of energy values 445A' in the same way as previously described for the single-maxima receiver 300. Each energy value 445A' within a group of energy values 445A' associated with a group of samples 325A' represents the measure of confidence that the group of samples 325A' of the received signal corresponds to a particular orthogonal code. Since each orthogonal code has a corresponding index symbol, each energy value 445A' within a group of energy values 445A' associated with a group of samples 325A' represents the measure of confidence that the group of samples 325A' of the processed received signal corresponds to a particular index symbol. Similarly, the other fingers generate groups of energy values 445B' and 445C' associated with groups of samples 325B' and 325C' respectively. The groups of energy values 445A'–C' from each finger are carried to the decoder section 605.

Using the summer 500' in the decoder section 605, each group of energy values 445A' is directly added with other groups of energy values 445B'–C' from the other detector subsections 400B'–C' according to their associated orthogonal code (or index symbol) to create a group of combined energy values 505'. The combined energy value 505' for each index symbol is fed into the dual maxima metric generator 610 which uses a dual-maxima decoding algorithm (which approximates the maximum a posteriori (MAP) decoding algorithm). After acquiring a complete group of combined energy values 505', one combined energy value 505' for each index symbol, the dual-maxima metric generator 610 first searches for the largest combined energy value 505' in a first subset of the group of combined energy values 505' which have associated index symbols having "0" as the first digit. The dual-maxima metric generator then searches for the largest combined energy value 505' in a second subset of the group of combined energy values 505' which have associated index symbols having "1" as a first digit. The difference in the largest combined energy value 505' in the first subset with the largest combined energy value 505' in the second subset is output from the dual-maxima metric generator 610 as the first bit of soft decision data 545' for the first digit of the index symbol corresponding to the most likely orthogonal code. In other words, the first bit in the soft decision data 545' represents a measure of confidence of the value of the first digit of the interleaved data symbol actually sent.

Next, the dual-maxima metric generator searches for the largest combined energy value 505' in a third subset of the group of combined energy values 505' which have associated index symbols having "0" as a second digit and searches for the largest combined energy value 505' in the fourth subset of the group of combined energy values 505' which have associated index symbols having "1" as the second digit. The difference in the largest combined energy values is output as the second bit of soft decision data 545' for the second digit of the index symbol corresponding to the most likely orthogonal code. In other words, the second bit in the soft decision data 545' represents a measure of confidence of the value of the second digit of the interleaved data symbol actually sent.

This process continues until the dual-maxima metric generator 610 generates soft decision data 545' for the last digit in the index symbol most likely sent.

The soft decision data 545' for all the digits of the index symbol most likely sent is then carried to the deinterleaver 550'. The deinterleaver 550' de-interleaves the soft decision data 545' generating deinterleaved soft decision data 555'. The deinterleaved soft decision data 555' is then carried to the decoder 560' (typically a viterbi decoder) which decodes the deinterleaved soft decision data 555' into estimated digital traffic data bits 565'.

Sometimes the base stations use simple dual-maxima receivers that do not use the rake receiver design. Such receivers only have one finger.

The method used by simple dual maxima receivers to generate the soft decision data for the $k^{th}$ block of N complex transformer output signals $r_{k,1}, \ldots, r_{k,N}$ can be represented mathematically fairly easily as follows:

$$\Delta_{k,i} = \max\{|r_{k,m}|^2, m \in S_i\} - \max\{|r_{k,m}|^2, m \in \bar{S}_i\}, 1 \leq i \leq M,$$

where $S_i = \{n \in \{1, \ldots, N\}, i^{th}$ corresponding bit is "0"$\}$, $\bar{S}_i = \{n \in \{1, \ldots, N\}, i^{th}$ corresponding bit is "1"$\}$, $M = \log_2 N$ and $\Delta_{k,i}$ is the $i^{th}$ soft decision bit of the soft decision data associated with the $k^{th}$ block of transformer output signals.

A dual-maxima receiver is described in U.S. Pat. No. 5,442,627 entitled "Non-Coherent Receiver Employing a Dual-Maxima Metric Generation Process" and issued to Qualcomm Incorporated on Aug. 15, 1995. This patent is incorporated by reference herein in its entirety.

Despite the improved bit error performance of the dual-maxima receiver over the single-maxima receiver, there is still a need for an improved receiver with even better bit error performance than offered with the dual-maxima receiver. Such an improved receiver is needed to increase the system capacity of CDMA communications systems and better utilize the scarce RF spectrum.

SUMMARY OF THE INVENTION

The invention can be summarized according to a first broad aspect as a multi-stage receiver for recovering a traffic signal embedded in at least one received signal. The invention also covers a method of recovering the traffic signal. The multi-stage receiver includes a plurality of sequential detection stages for processing each received signal and providing successively better estimates of the traffic signal.

The at least one received signal are typically supplied by a receiver section, and are associated with respective multipath paths of a sent signal encoded with the traffic signal and travelling through a transmission channel. Thus, according to a second broad aspect, the invention includes, for each received signal, a first processing stage connectable to the receiver section and a second processing stage connected to the respective first processing stage and connectable to the receiver section. The multi-stage receiver also includes a final processing stage connected to the at least one second processing stage.

Each first processing stage generates a first estimate of the traffic signal from the respective received signal and each second processing stage generates a set of values from the respective first estimate of the traffic signal and from the respective received signal. Each such value (which is preferably an energy value) is indicative of the likelihood of the traffic signal having a corresponding predetermined value and can be an energy value. The final processing stage combines the set of values from each second processing stage and generates an improved estimate of the traffic signal.

Each second processing stage can include a unit for buffering and delaying the respective received signal to ensure time alignment of the respective first estimate of the traffic signal with the respective received signal.

According to another broad aspect, the multi-stage receiver of the present invention may include one or more intermediate processing stages between the first and second processing stages. There may also be a feedback mechanism to loop the output of an intermediate stage to the input of the intermediate stage.

The invention may be summarized according to yet another broad aspect as including, for each received signal, a first processing stage connectable to the receiver section, for generating a set of values from the respective received signal, where each value is indicative of the likelihood of the traffic signal having a corresponding predetermined value. Next is a common processing stage connected to each first processing stage, which combines the set of values from each first processing stage and generates a first estimate of the traffic signal.

There is also provided, for each received signal, a second processing stage connected to the common processing stage and connectable to the receiver section, for generating another set of values from the first estimate of the traffic signal and from the respective received signal. These values are again indicative of the likelihood of the traffic signal having a corresponding predetermined value. Finally, the multi-stage receiver includes a final processing stage connected to the at least one second processing stage, for combining the set of values from each second processing stage and generating an improved estimate of the traffic signal.

By employing multiple stages in the receiver, there is an improvement in successive estimates of the traffic signal. Different levels of improvement are obtained if a different number of fingers or stages per finger is used. Also, the quality of the estimate is dependent on whether the first estimate of the traffic signal is made independently in each finger and combined in the final processing stage or if it is made in the common processing stage.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which.

DETAILED DESCRIPTION OF THE PREFERRED EMBODIMENTS

Figure 1:
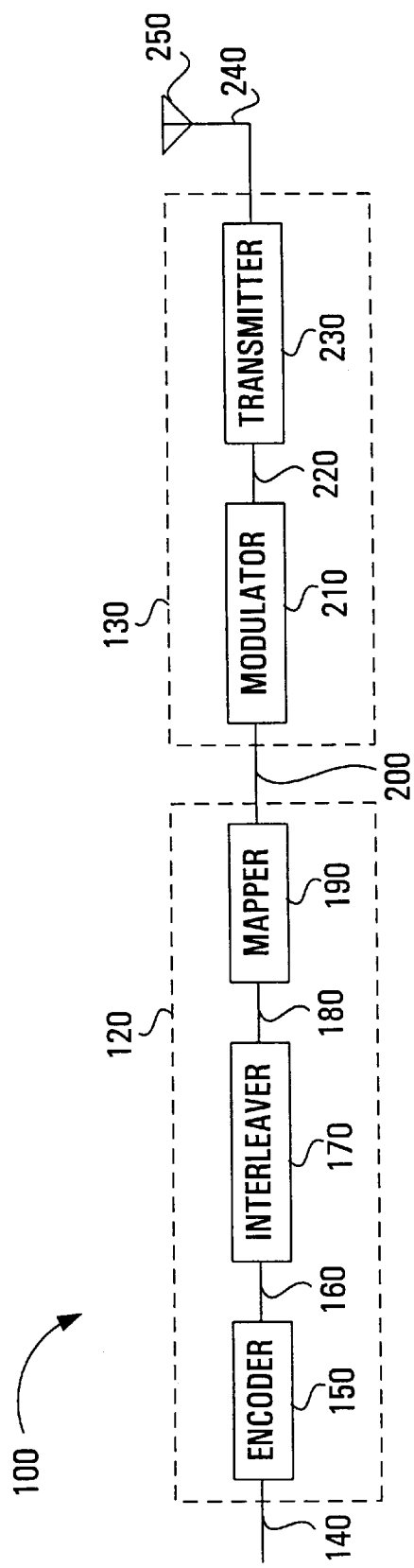
FIG. 1 is a block diagram of a conventional transmitter used by a mobile station in a CDMA communications network.

Referring to FIG. 1, in a conventional CDMA communications system, each mobile station sends traffic typically to the closest base station using a transmitter 100. The transmitter 100 consists of an encoding section 120 and modulating and transmitting section 130. The encoding section 120 is connected to the modulating and transmitting section 130. The transmitter 100 does not send a pilot (or reference) signal.

The encoding section 120 of the transmitter 100 consists of an encoder 150, an interleaver 170 and a mapper 190. The encoder 150 is connected to the interleaver 170 which is connected to the mapper 190. The modulating and transmitting section 130 consists of a modulator 210, a transmitter 230 and an antenna 250. The modulator 210 is connected to the transmitter 230 and the mapper 190. The transmitter 230 is connected to the antenna 250.

The transmitter 100 sends digital traffic (or a digital traffic signal) comprising traffic digital data bits 140. If the traffic is originally in analog form (i.e. analog traffic), such as voice, then an analog to digital to digital (A/D) converter or similar device is first employed to convert the analog traffic to digital traffic (comprising traffic digital data bits 140). The traffic digital data bits 140 are fed into the encoding section 120 of the transmitter 100 typically at 9600 kbits/sec. (Other speeds may be used). In particular, the traffic digital data bits 140 are first fed into the encoder 150 which encodes the traffic digital data bits 140 into data symbols 160 using an encoding algorithm which facilitates the maximum likelihood decoding of the received traffic by the base station serving the mobile station. The encoder 150 typically uses a convolution encoding algorithm. (Other algorithms may be used such as block coding algorithms). The encoder 150 outputs the data symbols 160 at a fixed encoding rate of one traffic digital data bit to three data symbols. (Other encoding rates such a one data bit to 2 data symbols may be used). The encoder 150 typically outputs the data symbols at 28.8 ksym/sec (other symbol rates may be used depending on the speed of the traffic digital data bits 140 being fed into the encoder 150 and the encoding rate). The data symbols 160 are fed into the interleaver 170 which block interleaves the data symbols 160 at the symbol level. The interleaver 170 fills a matrix of a predetermined size with the data symbols 160 on a column-by-column basis. The preferred predetermined size of the matrix is 32 rows by 18 columns (i.e. 576 cells). The size of the matrix depends on the length of a transmission block and the speed of the data symbols 160 sent from the encoder 150. The preferred length of a transmission block is 20 milliseconds (as specified by the ANSI J-STD-008 Standard). Consequently, since the preferred encoder outputs the data symbols 160 at 28.8 ksym/sec, the matrix must hold 576 data symbols 160 (i.e. 28.8 ksym/sec times 20 ms). Hence, a matrix of 18 by 32 is used.

The interleaver 170 outputs interleaved data symbols 180 from the matrix in a row-by-row manner at the same rate the data symbols 160 were inputted in the interleaver 170 (e.g. 28.8 ksym/sec). The interleaved data symbols 180 are fed into the mapper 190. The mapper 190 maps (or encodes) every group of 6 interleaved data symbols 180 into a corresponding Walsh code 200 from a group of 64 Walsh codes 200. Each Walsh code 200 is 64 bits long. (Alternatively, orthogonal codes other than Walsh codes can be used. Furthermore, the mapper 190 may map more or less than six interleaved data symbols 180 into a corresponding orthogonal code depending the length of the orthogonal codes selected). The mapper 190 outputs the Walsh codes 200 typically at a fixed rate of 307.2 ksymbols/sec. (Alternatively, other symbol rates can be used depending on the rate at which the interleaver 170 outputs interleaved data symbols 180 and the length of the orthogonal codes used). The digital signal comprising the Walsh codes 200 may be called a sent signal and is denoted s(k) where k indicates the sample time.

A frame of data symbols 160 (or a frame of interleaved data symbols 180) completely fills the matrix of the predetermined size used by the interleaver 170 (i.e. 576 cells in this case). Since the encoder 150 outputs the data symbols 160 at a fixed encoding rate of one data bit to three data symbols, 192 traffic digital data bits 140 are needed. (i.e. a frame of digital traffic data bits 140 has 192 bits). Since every group of 6 interleaved data symbols 180 are mapped into an orthogonal code, every frame of interleaved data symbols 180 is represented by 96 orthogonal codes.

The Walsh codes 200 are fed into the modulating and transmitting section 130 of the transmitter 100. In particular, the Walsh codes 200 are first fed into the modulator 210. The modulator 210 first spreads each Walsh code 200 with a long binary pseudo noise (PN) code in order to generate a respective pseudo noise (PN) sequence. Each mobile station 200 is assigned a unique long binary pseudo noise PN code with which to spread the Walsh code 200. (Alternatively, other long spreading codes may be used other than long binary PN codes). The long binary PN codes not only identify the mobile station but also enhance security by scrambling the traffic. The modulator 210 outputs the PN sequences at a high fixed PN chip rate (typically 1.228 mchips/sec). The resulting PN sequences facilitate the base station servicing the mobile station to discriminate or detect the RF signals carried on different reverse paths.

The modulator 210 then covers the PN sequences with a pair of different short codes (of the same length) in order to generate in-phase channel (or I-phase channel) and quadrature phase channel (or Q-phase channel) spread sequences 220. The in-phase channel and the corresponding quadrature phase spread sequences 220 may be represented as a digital signal with complex attributes.

The I-phase channel and the Q-phase channel spread sequences 220 are then fed into the transmitter 230. The I-phase channel and the Q-phase channel spread sequences 220 biphase modulate a quadrature pair of sinusoids. The sinusoids are summed and bandpass-limited with a bandpass filter. The bandpassed limited summed sinusoids modulate a RF carrier (which may be amplified) to generate a spread spectrum RF signal 240 which is radiated by the antenna 250.

The spread spectrum RF signal is received by a receiver at the base station. Each base station typically has a plurality of receivers, one for each mobile station to be serviced. The spread spectrum RF signal commonly arrives at the base station servicing the mobile station as a plurality of spread spectrum RF signals travelling on a plurality of different reverse paths. In a conventional CDMA communications system, the receivers are typically single maxima or dual maxima receivers as previously described.

Figure 5:
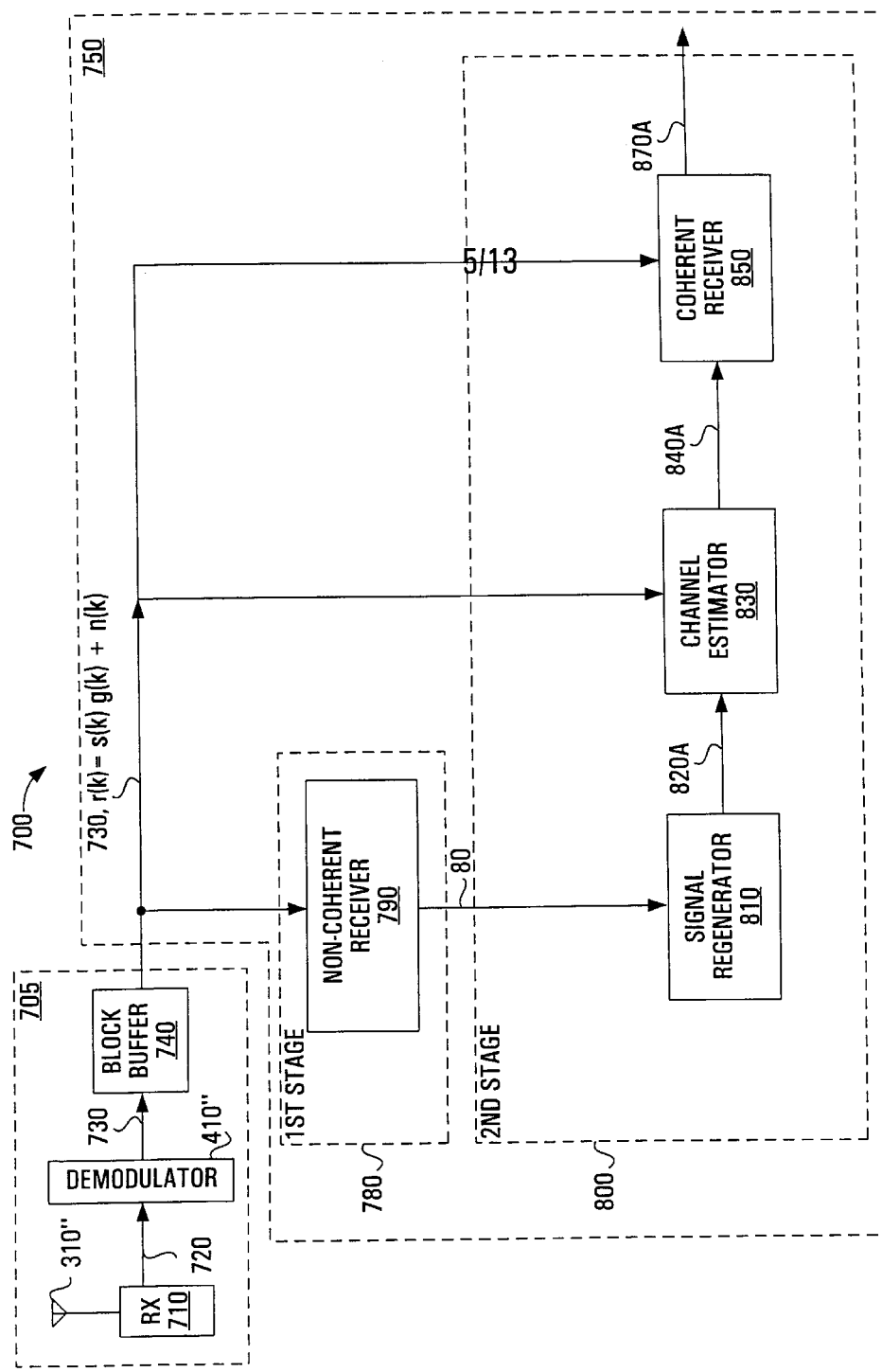
FIG. 5 is a block diagram of an improved multi-stage receiver in accordance with a first preferred embodiment of the present invention.

Referring now to FIG. 5 there is provided a multi-stage receiver 700 in accordance with a first preferred embodiment of the present invention. The multi-stage receiver 700 consists of a receiver and demodulator section 705 and a detector and decoder section 750.

The receiver and demodulator section 705 consists of an antenna 310", a receiver 710, a demodulator 410" and a block buffer 740. The receiver 710 is connected to the antenna 310" and to the demodulator 410". The demodulator 410" is connected to the block buffer 740. The antenna 310" and the demodulator 410" are identical to the antenna 310 and the demodulator 410 found in the single maxima receiver 300 shown in FIG. 2.

The detector and decoder section 750 consists of a first stage 780 and a second stage 800 connected to each other. The detector and decoder section 750 is connected to the receiver and demodulator section 705. In particular, the block buffer 740 is connected to the first stage 780 and to the second stage 800. The first stage 780 consists of a conventional non-coherent receiver 790. The second stage 800 consists of a signal regenerator 810, a channel estimator 830 and a coherent receiver 850. The channel estimator 830 is connected to the signal regenerator 810, to the coherent receiver 850 and to the block buffer 740. The conventional non-coherent receiver 790 is connected to the signal regenerator 810. The block buffer 740 is also connected to the coherent receiver 850.

The receiver 710 consists of a searcher receiver and a data receiver. For each RF signal sent by the transmitter 100 of a mobile station, the searcher receiver searches the received spread-spectrum RF signals arriving via the various reverse paths for the strongest spread-spectrum RF signals associated with the transmitter 100 of the mobile station (as identified by the PN code). The searcher receiver then instructs the data receiver to track and receive the RF signal carried in the reverse path with the strongest level. In particular, the data receiver demodulates the respective spread-spectrum RF signal and translates the respective spread-spectrum RF signal from the RF frequency to a processed received signal at a lower frequency. Furthermore, the data receiver samples at the PN chip rate (e.g. 1.2288 msamples/sec) the processed received signal to generate respective data samples 720 for the demodulator 410".

The demodulator 410" de-spreads the processed received signal by correlating the processed received signal with long PN code associated with the mobile station and the short spreading codes. In particular, the demodulator 410" produces samples of an in-phase signal and corresponding samples of a quadrature-phase signal. The samples of the in-phase signal and the corresponding samples of the quadrature-phase signal may be represented as one digital signal with complex attributes. That is, the samples of the in-phase signal and the corresponding samples of the quadrature phase signal may be represented as demodulated samples 730 using complex numbers. This digital signal may be called a first demodulated signal.

The first demodulated signal 730 may be represented mathematically as follows:

$$r(k)=s(k)g(k)+n(k)$$

where k is the number of the sample, r(k) represents the complex demodulated samples 730 of the first demodulated signal, s(k) represents the complex samples of the sent signal (generated by the transmitter 100), g(k) represents the complex samples of a channel information signal and n(k) represent samples of received noise. The sent signal s(k) carries the Walsh codes 200 actually sent by the transmitter 100. The channel information signal g(k) is used to provide information which reflects amplitude changes and/or phase changes as the RF signal sent by the transmitter 100 propagates through the air. The noise signal n(k) represents noise introduced as the RF signal propagates through the air from the transmitter 100 to the multi stage receiver 700.

The demodulated samples 730 are carried to the block buffer 740. The block buffer 740 buffers sets of demodulated samples 730. Each set of received signals 730 is used to attempt to reconstruct one frame of interleaved data symbols 180. Since 96 orthogonal codes were used to send a frame of interleaved data symbols 180 and since each orthogonal code is 64 bits long, each set consists of 6144 demodulated samples 730 which are buffered by the block buffer 740.

Once the block buffer 740 has a set of 6144 demodulated samples 730, the block buffer 740 sends a block of the demodulated samples 730, typically one received sample 730 at a time, to the first stage 780. The first stage simply comprises a conventional non-coherent receiver 790 which transforms the block of the demodulated samples 730 into 192 traffic data bits 80 (i.e. a frame of traffic data bits 80) which represent a first estimate of the original digital traffic (i.e. the original traffic digital data bits 140) sent by the transmitter 100.

Figure 6:
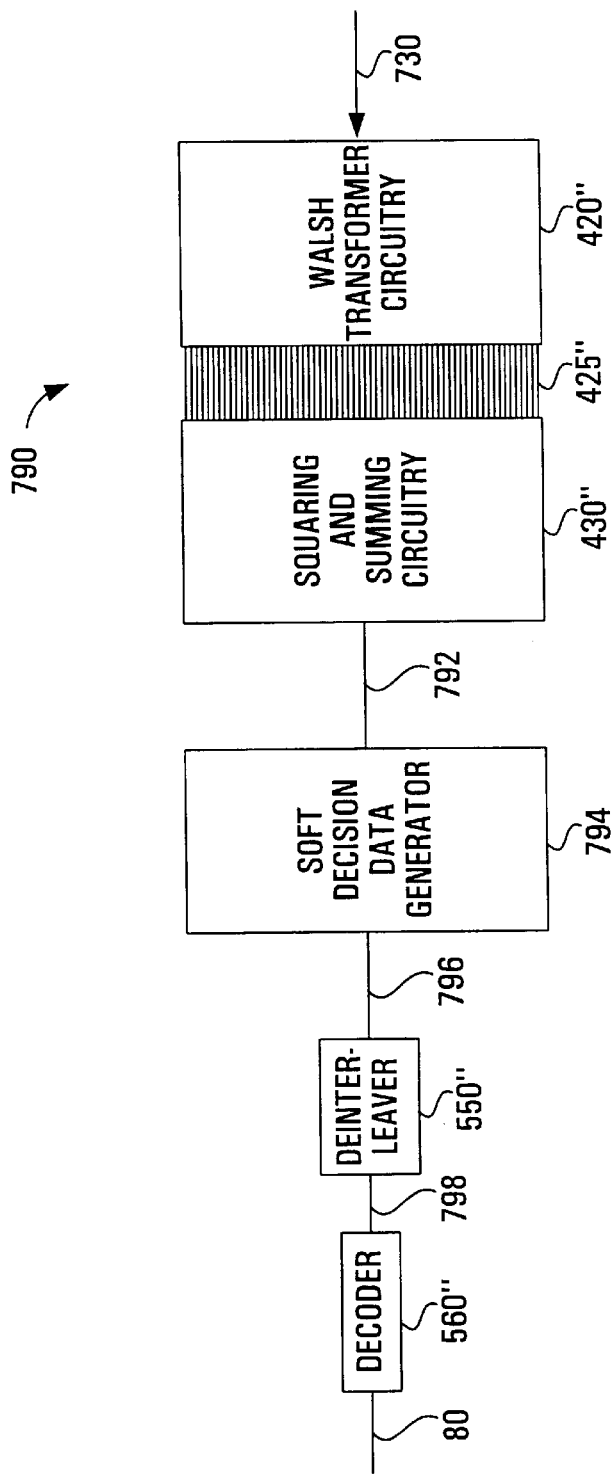
FIG. 6 is a block diagram of a conventional non-coherent receiver shown in FIG. 5.

The conventional non-coherent receiver 790 may be a modified single-maxima receiver or a modified dual-maxima receiver. Referring in particular to FIG. 6, the modified single-maxima receiver or the modified dual-maxima receiver simply consists of a previously described conventional single-maxima receiver 300 or a previously described conventional dual-maxima receiver 600, respectively, without the receiver section (330 and 330', respectively) and the demodulator (410 and 410', respectively) in the detector section (330 and 330' respectively). The conventional non-coherent receiver 790 consists of Walsh transformer circuitry 420", squaring and summing circuitry 430", a soft decision data generator 794, a deinterleaver 550" and a decoder 560". The Walsh transformer circuitry 420" and the squaring and summing circuitry 430" are identical to the Walsh transformer circuitry 420 and the squaring and summing circuitry 430 in the detector section 330 of the single-maxima receiver 300 shown in FIG. 2 and operate in exactly the same way. Similarly, the deinterleaver 550" and the decoder 560" are identical to the deinterleaver 550 and the decoder 560 in the decoder section 340 of the single-maxima receiver 300 shown in FIG. 2 and operate in exactly the same way.

The demodulated samples 730 are first fed into the Walsh transformer circuitry 420". For every group of demodulated samples 730, the Walsh transformer circuitry 420" generates 64 complex transformer output signals 425", one for each Walsh code. Each complex transformer output signal 425" is complex with one part representing a transformer output signal related to the in-phase component of the demodulated samples 730 and another part representing a transformer output signal related to the quadrature-phase component of the demodulated samples 730.

Each block of complex transformer output signals 425" is carried to the squaring and summing circuitry 430" which converts each block of complex transformer output signals into a group of energy values 792 (or decision values). Each energy value 792 within the group of energy values 792, associated with a particular group of demodulated samples 730, represents a measure of confidence that the group of demodulated samples 730 corresponds to a particular orthogonal code with a corresponding index value. Consequently, each row of the block of complex transformer signals 425" (i.e. each transformer signal) corresponds to a measure of confidence that a particular group of demodulated samples 730 corresponds to a particular orthogonal code from within the set of mutually orthogonal codes. Since each orthogonal code from the set of mutually orthogonal codes has a corresponding index symbol, each energy value 792 also has an associated index symbol.

Figure 4:
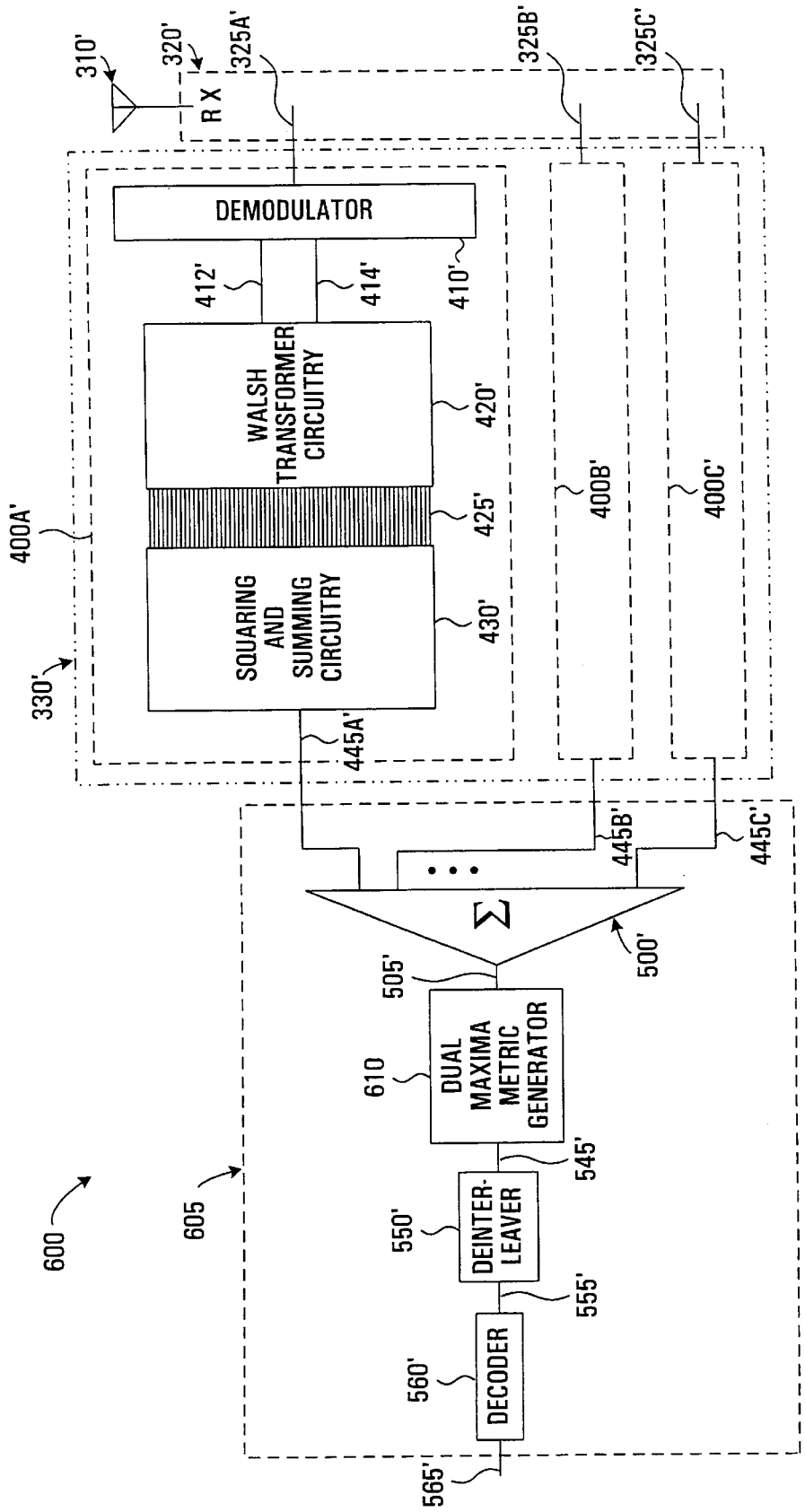
FIG. 4 is a block diagram of a conventional dual-maxima receiver used by a base station in a CDMA communications network.

Each group of energy values 792 is carried to the soft decision data generator 794. The soft decision data generator 794 transforms each group of energy values 792 into soft decision data 796 typically using either a single-maxima metric generator 540 or dual maxima metric generator 610 shown in FIGS. 2 and 4.

The soft decision data 796 is carried from the soft decision data generator 794 to the deinterleaver 550". The soft decision data 796 is inputted into a matrix of the predetermined size (32 rows by 18 columns) in a row-by-row manner. After the deinterleaver receives soft decision data for 96 groups of demodulated samples 730 (i.e. 96 Walsh blocks for 96 orthogonal codes), the matrix of the predetermined size (i.e. 32 rows by 18 columns) will be full. The deinterleaver 550" then outputs the soft decision data as data symbols 798 in a column-by-column manner. The data symbols 798 are carried to the decoder 560" which decodes the data symbols 798 into traffic data bits 80. As mentioned earlier, the traffic data bits 80 are the first estimate of the traffic digital data bits 140 sent by the transmitter 100.

Figure 7:
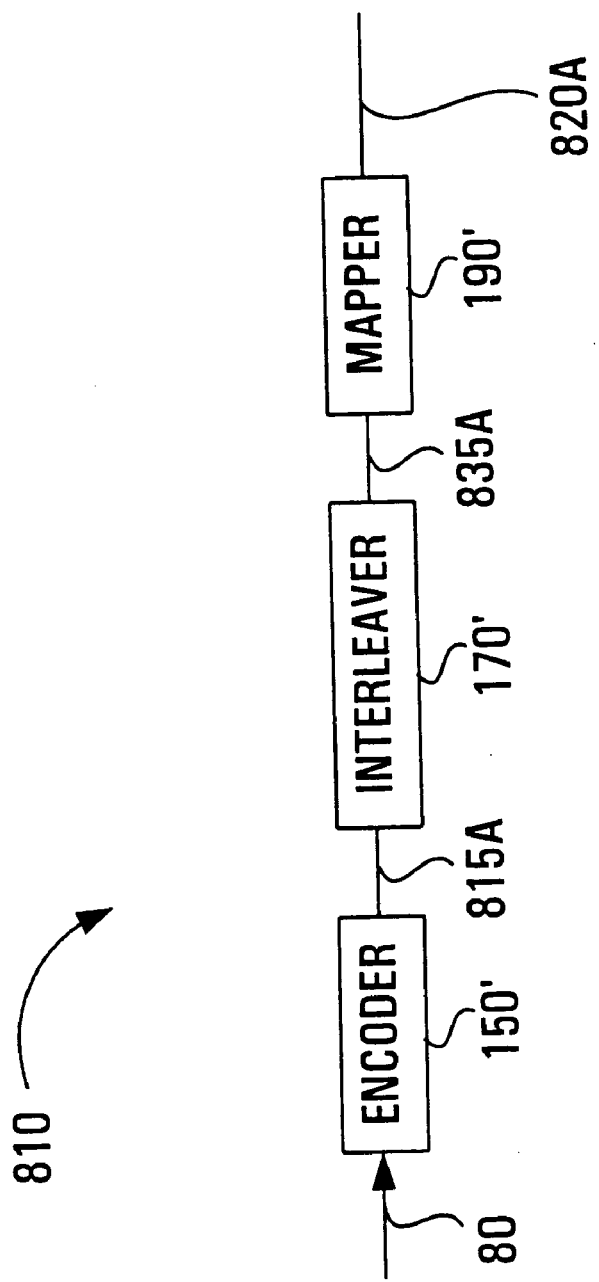
FIG. 7 is a block diagram of a signal regenerator shown in FIG. 5.

Referring back to FIG. 5, the traffic data bits 80 output by the non-coherent receiver 790 are carried from the first stage 780 to the second stage 800. In particular, the traffic data bits 80 are carried from the non-coherent receiver 790 to the signal regenerator 810. With reference now to FIG. 7, the signal regenerator 810 comprises an encoder 150', an interleaver 170', and a mapper 190' which are identical to the encoder 150, the interleaver 170 and the mapper 190 found in the transmitter 100 shown in FIG. 1 and operate in exactly the same way. The interleaver 170' is connected to the encoder 150' and to the mapper 190'.

The data bits 80 are fed into the encoder 150' which encodes the data bits 80 into data symbols 815A using the same encoding algorithm used by the transmitter 100. The encoder 150' outputs the data symbols 815A at the same fixed encoding rate used by the transmitter 100 (e.g. one data bit to three data symbols). The encoder 150' typically outputs the data symbols 815A at the same rate that the encoder 150 in the transmitter 100 outputs the data symbols, e.g., at 28.8 ksym/sec. The data symbols 815A are fed into the interleaver 170' which block interleaves the data symbols 815A in exactly the same way as the interleaver 170 in the transmitter 100 interleaves the data symbols 160, that is to say, at the symbol level. The interleaver 170' fills a matrix of the predetermined size with the data symbols 815A in a column-by-column basis. The predetermined size of the matrix is typically 32 rows by 18 columns, i.e., 576 cells.

The interleaver 170' outputs interleaved data symbols 835A from the matrix in a row-by-row manner at the same rate that the data symbols 815A were inputted to the interleaver 170'. The interleaved data symbols 835A are fed into the mapper 190'. The mapper 190' maps (or encodes) every group of 6 interleaved data symbols 835A into a corresponding Walsh code 820A from a group of 64 Walsh codes. The mapper 190' then outputs the Walsh codes 820A typically at a fixed rate of 307.2 ksymbols/sec.

The digital signal comprising the Walsh codes 820A may be called a second demodulated signal. The Walsh codes 820A are a first estimate of the sent signal s(k) generated by the transmitter 100.

With reference again to FIG. 5, the Walsh codes 820A (i.e., the estimate of s(k)) are carried from the mapper 190' to the channel estimator 830. In addition, the block of demodulated samples 730 are also carried from the block buffer 740 to the channel estimator 830. Since it takes time for the non-coherent receiver 790 and the signal regenerator 810 to process and transform the block of demodulated samples 730 into the Walsh codes 820A, the channel estimator 830 delays the block of demodulated samples 730 for a first predetermined time to ensure that the Walsh codes 820A are synchronized with the demodulated samples 730. Using conventional techniques known in the art, the channel estimator 830 generates samples 840A, which represent a first estimate of the channel information signal g(k), using the Walsh codes 820A and the demodulated samples 730.

The samples 840A (representing g(k)) are carried from the channel estimator 830 to the coherent receiver 850. In addition, the block of the demodulated samples 730 are carried from the block buffer 740 to the coherent receiver 850. Since it takes time for the non-coherent receiver 790, the signal regenerator 810 and the channel estimator 830 to generate the samples 840A, the coherent receiver 850 block delays the block of received signals 730 for a second predetermined time to ensure that the samples 840A (representing g(k)) are synchronized with the demodulated samples 730. The coherent receiver 850 is typically a conventional coherent receiver. The coherent receiver 850 uses the synchronized demodulated samples 730 (i.e. r(k)) and the samples 840A (i.e. g(k)) to generate traffic data bits 870A which represent a second estimate of the original digital traffic (i.e. the original traffic digital data bits 140) sent by the transmitter 100. The second estimate of the original traffic digital data bits 140 is better than the first estimate of the original traffic digital data bits 140. Consequently, the multi-stage receiver 700 typically has a better bit error performance than the conventional single-maxima receiver 300 or the conventional dual-maxima receiver 600 shown in FIGS. 2 and 4, respectively.

Figure 8:
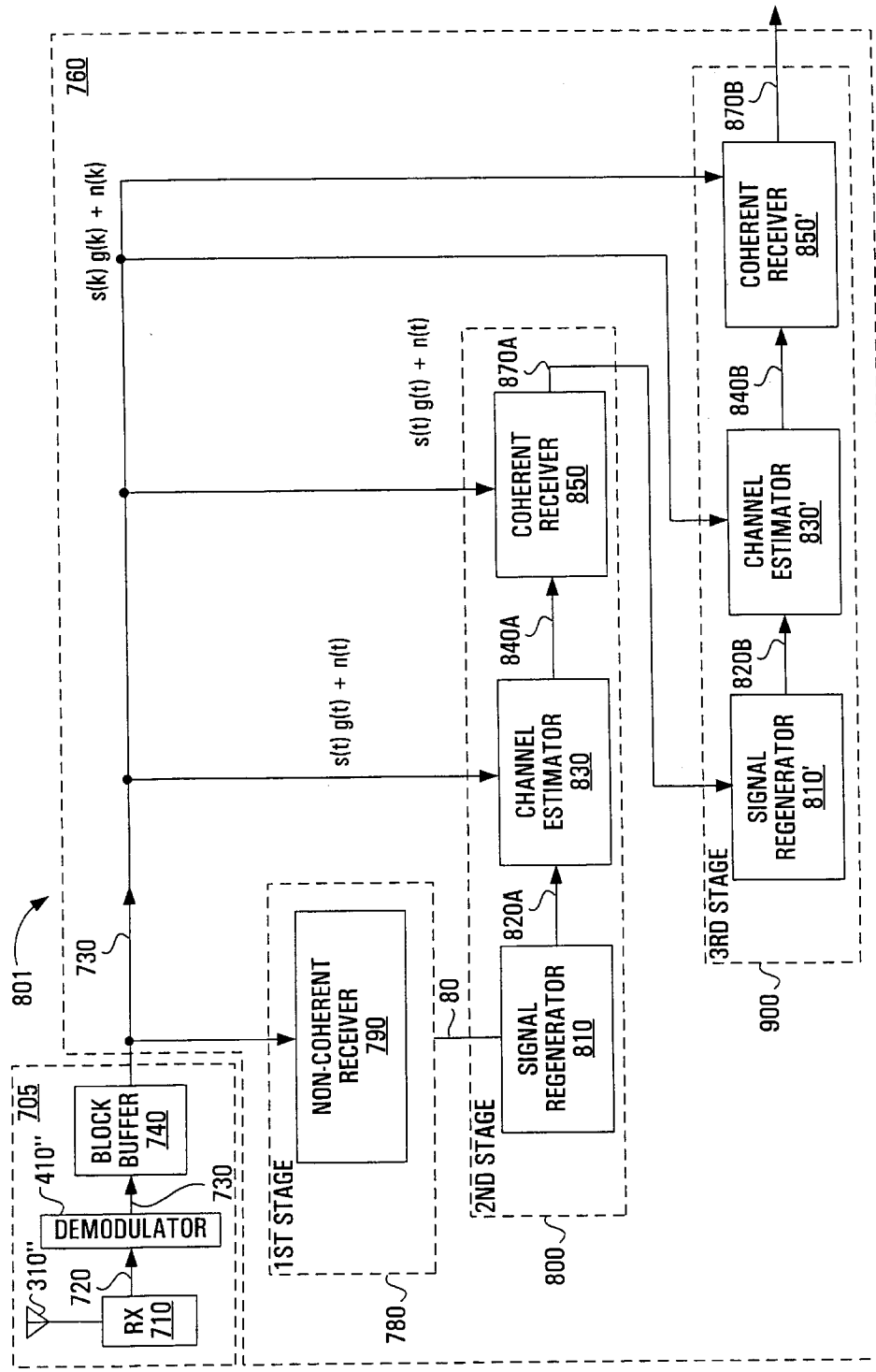
FIG. 8 is a block diagram of an improved multi-stage receiver in accordance with a second preferred embodiment of the present invention.

Other stages identical to the second stage 800 can be added to the multi stage receiver 700. In accordance with a second preferred embodiment of the present invention, and with reference to FIG. 8 there is provided a multi stage receiver 801 with a detector and decoder stage 760 with a third stage 900. The multi-stage receiver 801 is identical to the multi-stage receiver 700 with the addition of the third stage 900. The third stage 900 is connected to the second stage 800 and to the receiver section 705.

The third stage 900 is similar to the second stage 800 and operates in a similar way. The third stage 900 consists of a signal regenerator 810', a channel estimator 830' and a coherent receiver 850' which are essentially identical to the signal regenerator 810, the channel estimator 830 and the coherent receiver 850 in the second stage 800. The channel estimator 830' is connected to the signal regenerator 810' and to the coherent receiver 850'. The third stage 900 is connected to the second stage 800 and to the block buffer 740. In particular, the coherent receiver 850 in the second stage 800 is connected to the signal regenerator 810' in the third stage 900. The block buffer 740 is connected to the channel estimator 830' and to the coherent receiver 850'.

In operation, the receiver section 705, the first stage 780 and the second stage 800 operate in exactly the same was as previously described for the multi stage receiver 700 shown in FIG. 5. That is, the received RF signal is translated to a processed received signal which is sampled and demodulated, generating demodulated samples 730 of the first demodulated signal. A block of the received signals 730 is carried to the first stage 780 and to the second stage 800 which generate traffic data bits 870A as previously described.

The traffic data bits 870A are carried from the coherent receiver 850 in the second stage 800 to the signal regenerator 810' in the third stage 900. The signal regenerator 810' operates in exactly the same way as the signal regenerator 810 in the multi stage receiver 700. That is, the signal regenerator 810' transforms traffic data bits 870A into Walsh codes 820B which represent a second estimate of the sent signal s(k). The digital signal comprising the Walsh codes 820B may be called a third demodulated signal.

The Walsh codes 820B (i.e. the estimate of s(k)) are carried from the signal regenerator 810' to the channel estimator 830' which operates in the same way as the channel estimator 830 in the multi stage receiver 700. That is, the block of demodulated samples 730 are also carried from the block buffer 740 to the channel estimator 830'. Since it takes time for the first stage 780, the second stage 800 and the signal regenerator 810' to process and transform the block of demodulated samples 730 into the Walsh codes 820B, the channel estimator 830' delays the block of demodulated samples 730 for a third predetermined time in order to synchronize the demodulated samples 730 with the Walsh codes 820B. Using conventional techniques known in the art, the channel estimator 830' generates samples 840B using the Walsh codes 820B and the demodulated samples 730. The samples 840B represent a second estimate of the channel information signal g(k).

The samples 840B representing the second estimate of g(k) are carried from the channel estimator 830' to the coherent receiver 850'. In addition, the block of demodulated samples 730 is carried from the block buffer 740 to the coherent receiver 850'. Since it takes time for the first stage 780, the second stage 800, the signal regenerator 810' and the channel estimator 830' to generate samples 840B (i.e. g(k)), the coherent receiver 850' block delays the block of received signals 730 for a fourth predetermined time to ensure that the samples 840B (i.e g(k)) are synchronized with the demodulated samples 730. The coherent receiver 850' is typically a conventional coherent receiver. The coherent receiver uses the synchronized demodulated samples 730 (i.e. r(k)) and the samples 840B (i.e. g(k)) to generate traffic data bits 870B which represent a third estimate of the original digital traffic (i.e. the original traffic digital data bits 140) sent by the transmitter 100. The third estimate of the original traffic digital data bits 140 is even better than the first and second estimates of the original traffic digital data bits 140. Consequently, the enhanced multi stage receiver 801 typically has a better bit error performance than the conventional single-maxima receiver 500 or the conventional dual-maxima receiver 600 or the multi stage-receiver 700 shown in FIGS. 2, 4 and 5, respectively.

Figure 9:
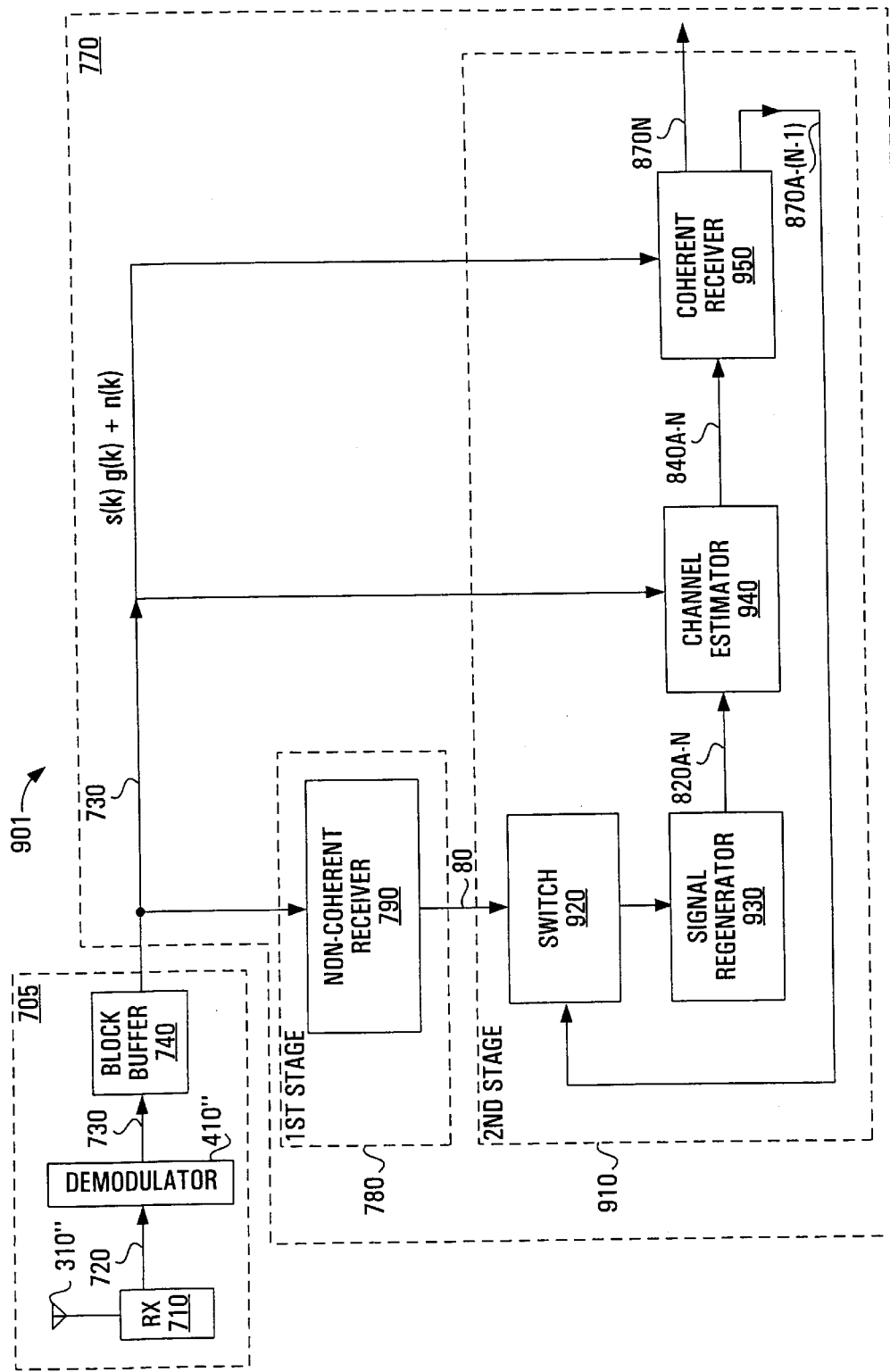
FIG. 9 is a block diagram of an improved multi-stage decision feedback receiver in accordance with a third preferred embodiment of the present invention.

By providing a feedback loop, it is possible to eliminate the third stage 900 in the enhanced multi stage receiver 801 and obtain the same or even better bit error performance. In accordance with a third embodiment of the present invention, and with reference now to FIG. 9, there is provided a multi stage decision feedback receiver 901. The multi-stage decision feedback receiver 901 has the same receiver and demodulator section 705 used in the multi-stage receiver 700 shown in FIG. 5. However, the multi-stage decision feedback receiver 901 has a different detector and decoder stage 770. The detector and decoder stage 770 has the same first stage 780 found in the multi-stage receiver 700 shown in FIG. 5 but has a different second stage 910. The second stage 910 is similar to the second stage 800 found in the multi stage receiver 700 with the addition of a switch 920 and a feedback loop. Furthermore, the non-coherent receiver 790 in the first stage 780 is no longer directly connected to the signal regenerator 810 as shown in FIG. 5. The non-coherent receiver 790 is connected to the switch 920 as shown in FIG. 9. The switch 920 is connected to a signal regenerator 930. A coherent receiver 950 is also connected to the switch 920 providing the feedback loop. A channel estimator 940 is connected between the signal regenerator 930 and the coherent receiver 950.

The receiver section 705 and the first stage 780 operate in exactly the same way as previously described for the multi-stage receiver 700. That is, for every block of demodulated samples 730, the non-coherent receiver 790 generates (or recovers) a frame of 192 traffic data bits 80. The switch 920 allows the traffic data bits 80 to pass through the switch 920 to the signal regenerator 930.

The signal regenerator 930 is identical to the signal regenerator 810 found in the multi stage receiver 700 and operates in exactly the same way. That is, the signal regenerator 930 transforms the traffic digital data bits 80 into Walsh codes 820A.

The Walsh codes 820A (i.e., the first estimate of s(k)) are carried from the signal regenerator 930 to the channel estimator 940. In addition, the block of demodulated samples 730 are also carried from the block buffer 740 to the channel estimator 940. Since it takes time for the non-coherent receiver 790 and the signal regenerator 930 to process and transform the block of demodulated samples 730 into the Walsh codes 820A, the channel estimator 940 delays the block of demodulated samples 730 for a first predetermined time to ensure that the Walsh codes 820A are synchronized with the demodulated samples 730. Using conventional techniques known in the art, the channel estimator 940 generates samples 840A, which represent a first estimate of the channel information signal g(k), using the Walsh codes 820A and the demodulated samples 730.

The samples 840A representing g(k)) are carried from the channel estimator 940 to the coherent receiver 950. In addition the block of the demodulated samples 730 are carried from the block buffer 740 to the coherent receiver 950. Since it takes time for the non-coherent receiver 790, the signal regenerator 930 and the channel estimator 940 to generate the samples 840A (i.e. g(k)), the coherent receiver 950 block delays the block of received signals 730 for a second predetermined time to ensure that the samples 840A (representing g(k)) are synchronized with the demodulated samples 730. The coherent receiver 950 is typically a conventional coherent receiver. The coherent receiver 950 uses the synchronized demodulated samples 730 (i.e., r(k)) and the samples 840A (i.e., g(k)) to generate traffic data bits 870A which represent a second estimate of the original digital traffic (i.e., the original traffic digital data bits 140) sent by the transmitter 100.

However, the traffic data bits 870A are fed back to the switch 920 which prevents any further traffic data bits 80 from passing through the switch 920 but allows the traffic data bits 870A to pass through the switch 920 to the signal regenerator 930. Using the traffic data bits 870A, the signal regenerator 930 then generates Walsh codes 820B (i.e., the second demodulated signal) which are carried to the channel estimator 940. As mentioned earlier, the demodulated samples 730 are carried from the block buffer 740 to the channel estimator 940. Since it takes time for the first stage 780 and the second stage 910 to generate the traffic data bits 870A and to regenerate the traffic data bits 870A to Walsh codes 820B, the channel estimator 940 block delays the block of the demodulated samples 730 for a third predetermined time to ensure that the demodulated samples 730 are properly synchronized with the Walsh codes 820B. Using the samples 820B and the demodulated samples 730, the channel estimator 940 generates samples 840B which represent a second estimate of the channel information signal g(k).

The samples 840B (i.e. representing g(k)) are carried from the channel estimator 940 to the coherent receiver 950. The demodulated samples 730 are also carried to the coherent receiver 950. Since it takes time for the first stage 780 and the second stage 910 to generate traffic data bits 870A and for the traffic data bits 870A to be transformed into samples 840B, the coherent receiver 950 block delays the block of the received signals 730 for a fourth predetermined time to ensure that the samples 840B are properly synchronized with the demodulated samples 730. Using the samples 840B and the demodulated samples 730, the coherent receiver 950 generates traffic data bits 870B. The traffic data bits 870B represent a third estimate of the original traffic digital data bits 140 sent by the transmitter 100. The third estimate of the original traffic digital data bits 140 is even better than the first and second estimates of the original traffic digital data bits 140.

The traffic data bits 870B may be outputted from the receiver 901 or may be fed back to the switch 920 for another iteration to generate traffic data bits 870C, 870D . . . , 870N, etc. Typically, the traffic data bits 870N are outputted from the multi stage decision feedback receiver after 3 or 4 iterations. After three or four iterations, the improvement in bit error performance through more iterations is marginal. After the last iteration, the switch 920 allows the next data bits 80 to pass through the switch to the signal regenerator 930.

Further variations of the present invention are possible. For example, in third generation CDMA, it is contemplated that the mobile stations will use transmitters that will send a pilot signal. The pilot signal will provide channel information relating to amplitude changes (i.e. fading) and phase changes to the receivers at the base station. As a result, the non-coherent receiver 790 (as shown in the first, second and third embodiments) is replaced with a coherent receiver. The coherent receiver will transform the demodulated samples 730 into traffic bits 80 using coherent demodulation techniques known in the art.

Another variation of the invention is possible. With reference to FIG. 5, the demodulator 410" in the receiver section 705 used in the multi-stage receiver 700 can be eliminated. The receiver 710 is simply connected to the block buffer 740. The block buffer 740 buffers samples 720 of the processed received signal from the receiver 710. The digital signal comprising the samples 720 may be called a first modulated signal. The first modulated signal may be represented mathematically as follows:

$$r'(k)=s'(k)g'(k)+n'(k),$$

where k is the number of the sample, r'(k) represents the complex-valued modulated samples 720 of the first modulated signal, s'(k) represents the complex-valued samples of a sent modulated signal (generated by the transmitter 100), g'(k) represents complex-valued samples of a second channel information signal and n'(k) represents complex-valued samples of a second received noise signal.

The sent modulated signal consists of the Walsh codes 200 spread by the long and short spreading codes (i.e. the in-phase channel and the corresponding quadrature-phase channel spread sequences 220) generated by the transmitter 100. Since the RF signal actually sent by the transmitter 100 may undergo amplitude changes and/or phase changes as the RF signal propagates-through the air, g'(k) is used to provide the necessary channel information to reflect these changes. The samples of the second noise signal n'(k) represent noise introduced as the RF signal propagates through the air from the transmitter 100 to the multi stage receiver.

Once the block buffer 740 is full, the block buffer 740 provides the samples 720 of the processed received signal to a detector section having a first stage and a second stage. Since samples of a demodulated signal (previously called the first demodulated signal) are not provided to the first stage and to the second stage, the non-coherent receiver in the first stage and the coherent receiver in the second stage are converted so as to each contain a demodulator which is identical to the demodulator 410" formerly in the receiver section 705 and which operates in exactly the same way. Alternatively, if the first stage uses a coherent receiver, the coherent receiver in the first stage has a demodulator which is identical to the demodulator 410" formerly in the receiver section 705 and which operates in exactly the same way.

In particular, the converted non-coherent receiver in the first stage is the non-coherent receiver 790 shown in FIG. 6 but equipped with a demodulator connected to the Walsh transformer circuitry 420". The demodulator transforms the samples 720 into demodulated samples which are carried to the Walsh transformer circuitry 420". (The digital signal comprising the demodulated samples may be called a first demodulated signal). The demodulated samples are typically identical to the demodulated samples 730 generated by the demodulator 410" in the block detection receiver 700 shown in FIG. 5.

The Walsh transformer circuitry 420", the squaring and summing circuitry 430", the soft decision data generator 794, the deinterleaver 550" and the decoder 560" operate as previously described and generate digital data bits 80 (i.e., a frame of traffic data bits) which represent a first estimate of the original digital traffic (i.e. the original traffic digital data bits 140) sent by the transmitter 100.

The second stage no longer uses a signal regenerator 810 but uses a signal remodulator. The digital data bits 80 are carried to the signal remodulator from the converted non-coherent receiver. The signal remodulator is the same as the signal regenerator 810 shown in FIG. 7 but also has a modulator connected to the mapper 190'. In the same way as previously described for the signal regenerator, the signal remodulator generates Walsh codes 820A. The Walsh codes 820A are carried to the modulator. The modulator is identical to the modulator 210 used by the transmitter 100. The modulator first spreads each Walsh code 820A with the long binary PN code used by the transmitter 100 in order to generate PN sequences. The modulator then spreads the PN sequences with the pair of short spreading codes (used by the modulator 210) to generate in-phase channel and quadrature phase channel spread sequences. The in-phase channel and the quadrature phase channel spread sequences may be represented as one digital signal using complex mathematics. This digital signal may be called a second modulated signal.

The first modulated signal and the second modulated signal are carried to a converted channel estimator which is similar to the channel estimator 830 shown in FIG. 5. Since it takes time for the converted non-coherent receiver (with a demodulator) and the signal remodulator to generate the second modulated signal, the converted channel estimator block delays the first modulated signal for a first predetermined time to ensure that the first modulated signal and the second modulated signal are synchronized. The converted channel estimator then generates channel estimation samples using the first modulated signal and the second modulated signal. The channel estimation samples represent a first estimate of the second channel information signal g'(k). The channel estimation samples and the first modulated signal are carried to the converted coherent receiver in the second stage.

As mentioned earlier, the converted coherent receiver has a demodulator which demodulates and transforms the samples 720 (of the first modulated signal) into demodulated samples. The digital signal comprising these demodulated samples may be called a second demodulated signal. Since it takes time for the first stage, the signal remodulator and the converted channel estimator to generate the channel estimation samples, the converted coherent receiver block delays the first modulated signal (or the second demodulated signal) for a second predetermined time to ensure that the second demodulated signal is synchronized with the channel estimation samples. Using the demodulated samples from the second demodulated signal and the channel estimation samples, the converted coherent receiver generates traffic data bits which represent a second estimate of the original digital traffic (i.e. the original traffic digital data bits 140) sent by the transmitter 100.

The traffic data bits which represent the second estimate of the original digital traffic may be output from the receiver or may be input to another stage (i.e. a third stage). The third stage is similar to the second stage and operates in a similar way. That is, the third stage consists a second signal remodulator, a second converted channel estimator and a second converted coherent receiver which are essentially identical to the signal remodulator, the converted channel estimator and the converted coherent receiver in the second stage. The second converted channel estimator is connected to the second signal remodulator and the second converted coherent receiver. The third stage is connected to the second stage and to the block buffer 740. In particular, the coherent receiver is connected to the second signal remodulator. The block buffer 740 is connected to the second converted channel estimator and to the second converted coherent receiver.

The traffic data bits which represent the second estimate of the original digital traffic are inputted into the second signal remodulator. The second signal remodulator is identical to the signal remodulator in the second stage and operates in exactly the same way. That is, the second signal remodulator generates a third modulated signal from the traffic data bits from the coherent receiver in the second stage. The third modulated signal and the first modulated signal are carried to the second converted channel estimator which operates in a similar way to the converted channel estimator in the second stage. Since it takes time for the converted non-coherent receiver (with a demodulator) in the second stage and the second signal remodulator to generate the third modulated signal, the second converted channel estimator block delays the first modulated signal for a third predetermined time to ensure that the first modulated signal and the third modulated signal are synchronized. The second converted channel estimator then generates second channel estimation samples using the first modulated signal and the third modulated signal. The second channel estimation samples represent a second estimate of the second channel information signal g'(k). The second channel estimation samples and the first modulated signal are carried to the second converted coherent receiver in the third stage.

The second converted coherent receiver has a demodulator which demodulates and transforms the samples 720 (of the first modulated signal) into demodulated samples. Since it takes time for the first stage, the second stage, the second signal remodulator and the second converted channel estimator to generate the second channel estimation samples, the second converted coherent receiver block delays the first modulated signal (or the associated demodulated samples) for a fourth predetermined time to ensure that the demodulated samples are synchronized with the second channel estimation samples. Using the demodulated samples and the second channel estimation samples, the second converted coherent receiver generates traffic data bits which represent a third estimate of the original digital traffic (i.e. the original traffic digital data bits 140) sent by the transmitter 100.

The traffic data bits which represent the third estimate of the original digital traffic may be output from the receiver or may be input to another stage (i.e. a fourth stage).

Alternatively, the third stage (and any additional stages) may be eliminated by providing a switch in the second stage and a feedback loop. The converted non-coherent receiver in the first stage is no longer connected to the signal remodulator in the second stage. The switch is connected to the converted non-coherent receiver in the first stage and to the signal remodulator. The converted coherent receiver in the third stage is connected to the switch providing a feedback loop. The switch and the feedback loop are identical to the switch 910 and the feedback loop used by the multi-stage receiver 901 shown in FIG. 9 and operate in exactly the same way. That is, the multi-stage receiver with the switch and the feedback loop provide digital traffic bits which represent a first, a second, a third, etc., estimates of the original traffic digital data bits 140 sent by the transmitter 100.

Alternatively, once the block buffer 740 is full, the block buffer 740 provides the samples 720 of the processed received signal to a detector stage having a demodulator, a first stage and a second stage. The demodulator is identical to the demodulator 410" (which was removed from the receiver section 705) and operates in exactly the same way. That is, the demodulator demodulates the samples 720 from the block buffer 740 into a first demodulated signal comprising demodulated samples. The first demodulated signal is then provided to the first stage and the second stage. The first stage and the second stage are identical to the first stage 780 and the second stage 800 in the multi stage receiver 700 and operate in exactly the same way.

The traffic data bits from the second stage (which represent a second estimate of the original digital traffic 140) may be output from the receiver or may be input to another stage (e.g. a third stage) which generates more traffic data bits (which represent a third estimate of the original digital traffic 140) sent by the transmitter 100.

Yet another variation of the invention is possible. The invention can be applied to a rake receiver design where multiple signals corresponding to different paths are received and demodulated. In accordance with a fourth preferred embodiment of the present invention, and with reference to FIG. 10, there is provided a multi-stage receiver 1000. The multi-stage receiver 1000 consists of a receiver and demodulator section 1010, a detector section 1020 and a decoder section 1080. The receiver and demodulator section 1010 is connected to the detector section 1020. The detector section 1020 is connected to the decoder section 1080.

The receiver and demodulator section 1010 consists of an antenna 310''', a receiver 320'', two demodulators 410A, 410B and two block buffers 740A, 740B. The antenna 310''' is connected to the receiver 320''. The receiver 320'' is connected to the demodulators 410A, 410B. The demodulators 410A, 410B are connected to the block buffers 740A, 740B, respectively.

Figure 2:
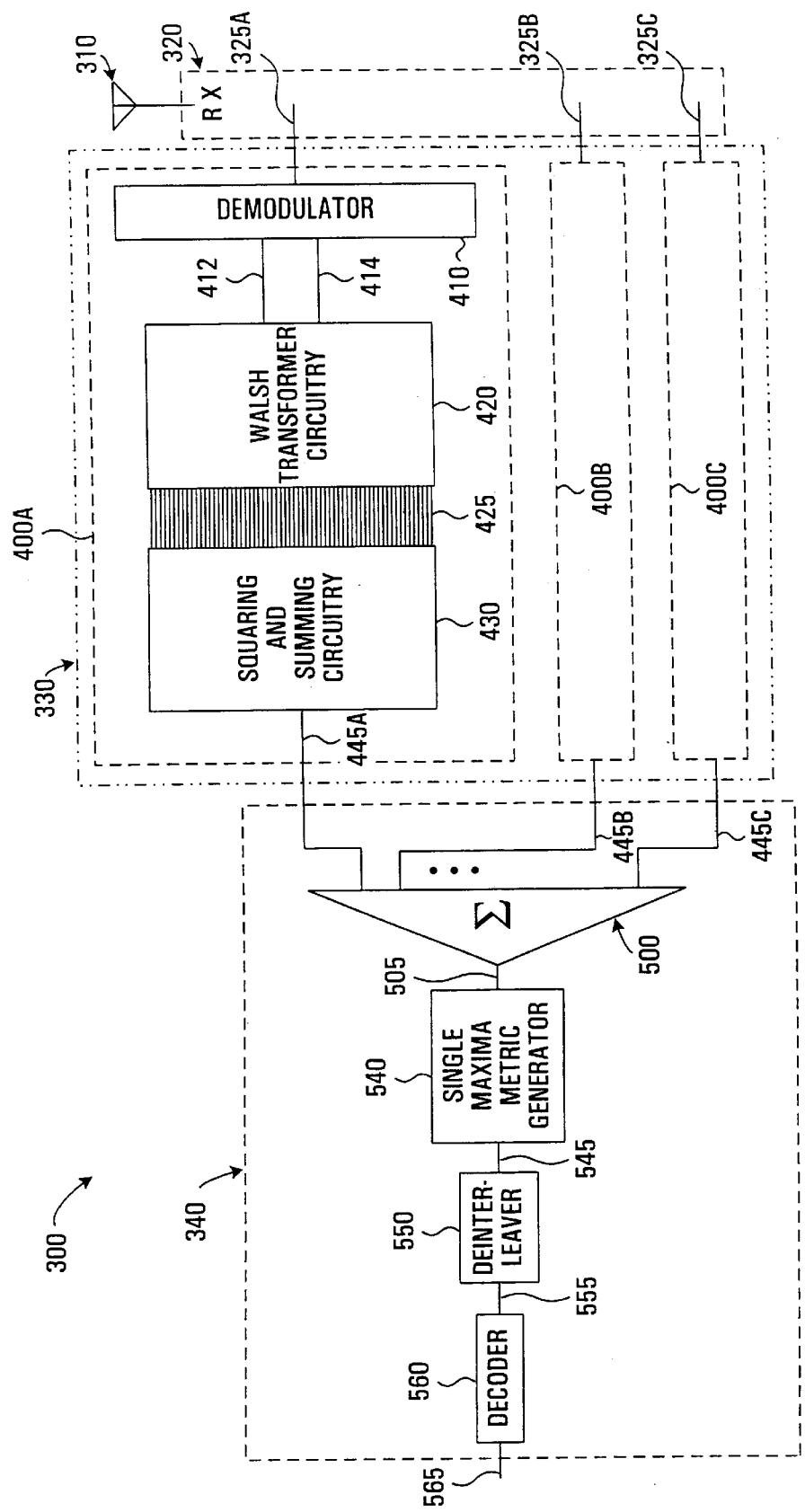
FIG. 2 is a block diagram of a conventional single-maxima receiver used by a base station in a CDMA communications network.
Figure 3:
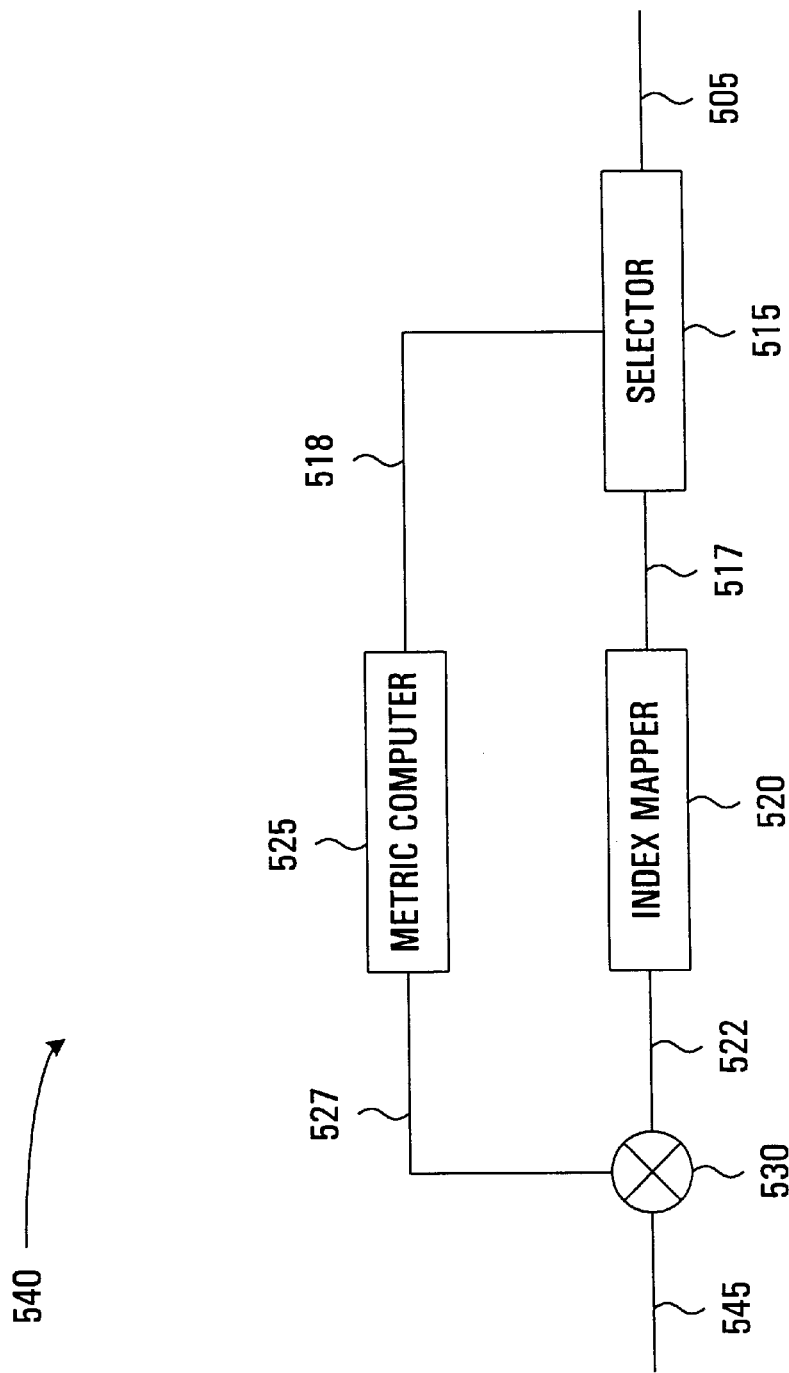
FIG. 3 is a block diagram of a single-maxima metric generator used by the single-maxima receiver shown in FIG. 2.

The receiver 320'' is essentially the same as the receiver section 320 found in the single maxima receiver 300 shown in FIG. 2 and operates in the same way. In particular, the receiver 320'' consists of one receiver subsection. (If more than one antenna 310''' is used, multiple receiver subsections would be employed, one for each antenna 310'''). The receiver subsection consists of a searcher receiver and two data receivers. More than two data receivers can be used, one for each path to be tracked. For each RF signal sent by a mobile station, the searcher receiver searches the received spread-spectrum RF signals arriving via the various reverse paths at the antenna 310''' for the strongest spread-spectrum RF signals associated with the mobile station. The searcher receiver then instructs the data receivers to track and receive the RF signals carried in the reverse paths with the strongest levels. Each data receiver typically receives and tracks a separate RF signal. In particular, each data receiver demodulates the respective spread-spectrum RF signal and translates the respective spread-spectrum RF signal from the RF frequency to a processed received signal at a lower frequency. Furthermore, each data receiver samples at the PN chip rate (e.g. 1.2288 Msamples/sec) the respective processed received signal to generate respective data samples 325A'' and 325B''. The data samples 325A'' and 325B'' are carried to the demodulators 410A and 410B, respectively.

Each demodulator 410A and 410B is identical to the demodulator 410 in the single maxima receiver 300 shown in FIG. 2 and operates in exactly the same way. The demodulator 410A de-spreads the processed received signal 325A'' to generate a first demodulated signal by correlating the processed received signal with a long PN code associated with the mobile station and the short spreading codes. In particular, the demodulator 410A produces samples of an in-phase signal and corresponding samples of a quadrature-phase signal. The samples of the in-phase signal and the corresponding samples of the quadrature-phase signal may be represented as one complex-valued digital signal comprising a plurality of demodulated samples 730A'. This digital signal may be called a first demodulated signal. Similarly, the demodulator 410B de-spreads the processed received signal 325B'' to generate a second complex-valued demodulated signal comprising a plurality of demodulated samples 730B'.

The demodulated samples 730A', 730B' are carried to the block buffers 740A and 740B respectively. Each block buffer 740A and 740B is identical to the block buffer 740 found in the multi-stage receiver 700 shown in FIG. 5 and operates in exactly the same way. The block buffers 740A and 740B respectively buffer sets of demodulated samples 730A' and 730B'. Once block buffer 740A has a set of demodulated samples 730A', the set of demodulated samples is carried to the detector section 1020. Similarly, once block buffer 740B has a set of demodulated samples 730B', the set of demodulated samples is carried to the detector section 1020.

The detector section 1020 comprises a first detector sub-section 1022A and a second detector sub-section 1022B. The combination of a data receiver with its respective demodulator, block buffer and detector sub-section may be called a finger using rake receiver terminology.

The first detector sub-section 1022A includes a first processing stage 780A connected to a second processing stage 1030A. The first processing stage 780A comprises a non-coherent receiver 790A. The second processing stage 1030A comprises a channel estimator 830A connected to a signal regenerator 810A and to a modified coherent receiver 1040A. The non-coherent receiver 790A is connected to the signal regenerator 810A. The block buffer 740A is connected to the non-coherent receiver 790A in the first processing stage 780A and to the channel estimator 830A and to the modified coherent receiver 1040A in the second processing stage 1030A.

The second detector sub-section 1022B is identical to the first detector sub-section 1022A. That is, the second detector sub-section comprises a first processing stage 780B connected to a second processing stage 1030B. The first processing stage 780B comprises a non-coherent receiver 790B which is identical to the non-coherent receiver 790A. The second processing stage comprises a channel estimator 830B connected to a signal regenerator 810B and to a modified coherent receiver 1040B. The block buffer 740B is connected to the non-coherent receiver 790B, to the channel estimator 830B and to the modified coherent receiver 1040B. The non-coherent receiver 790B is connected to the signal regenerator 810B.

Figure 10:
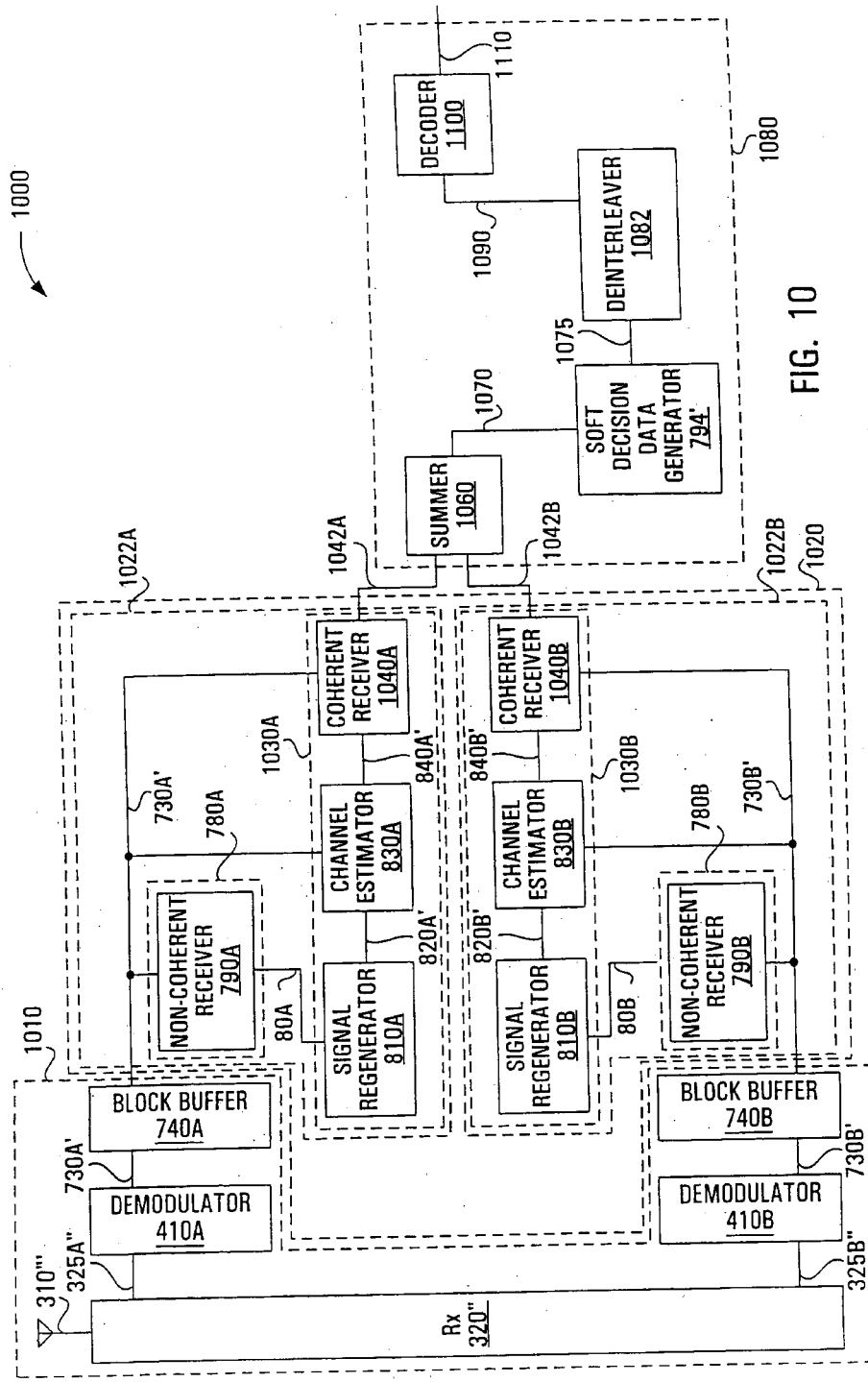
FIG. 10 is a block diagram of an improved multi-stage receiver using a rake receiver design in accordance with a fourth preferred embodiment of the present invention.

Each detector sub-section 1022A, 1022B is identical to the detector and demodulator section 750 of the multi-stage receiver 700 shown in FIG. 5 with the exception that the modified coherent receivers 1040A, 1040B do not have a decoder section (i.e., the modified coherent receivers in FIG. 10 do not have a summer, a soft decision data generator, a deinterleaver or a decoder).

The demodulated samples 730A', 730B' are carried to the non-coherent receivers 790A, 790B, respectively. As discussed above, each non-coherent receiver 790A, 790B is identical to the non-coherent receiver 790 in the multi-stage receiver 700 shown in FIG. 5 and therefore operates in exactly the same way. That is, the non-coherent receivers 790A, 790B generate traffic bits 80A, 80B, respectively, from the demodulated samples 730A', 730B', respectively.

The traffic bits 80A, 80B are carried to the signal regenerators 810A, 810B, respectively. Each signal regenerator 810A, 810B is preferably identical to the signal regenerator 810 in the multi-stage receiver 700 shown in FIG. 5 and therefore operates in exactly the same way. The signal regenerators 810A, 810B generate Walsh codes 820A', 820B', respectively, from the traffic bits 80A, 80B, respectively.

The Walsh codes 820A' generated by the first detector sub-section 1022A are a first estimate of the sent signal s(k). Similarly, the Walsh codes 820B' generated by the second detector sub-section 1022B are another first estimate of the sent signal s(k).

The Walsh codes 820A', 820B' are carried from the signal regenerators 810A, 810B, respectively, to the channel estimators 830A, 830B, respectively. Each channel estimator 830A, 830B is identical to the channel estimator 830 in the multi-stage receiver 700 and operates in exactly the same way. That is, the channel estimators 830A, 830B generate samples 840A', 840B', respectively, from the Walsh codes 820A', 820B', respectively, and the demodulated samples 730A', 730B', respectively. The samples 840A' generated by the first detector sub-section 1022A represent a first estimate of the channel information signal g(k). Similarly, the samples 840B' generated by the second detector sub-section 1022B represent another first estimate of the information channel signal.

The samples 840A', 840B' are carried from the channel estimators 830A, 830B, respectively to the modified coherent receivers 1040A, 1040B, respectively. Each modified coherent receiver 1040A, 1040B is identical to the coherent receiver 850 in the multi-stage receiver 700 shown in FIG. 5 with the exception that the modified coherent receivers 1040A, 1040B do not have a decoder section. The modified coherent receivers 1040A, 1040B generate energy levels 1042A, 1042B, respectively, using the samples 840A', 840B', respectively, and the demodulated samples 730A', 730B' respectively.

The energy levels 1042A, 1042B are carried from the modified coherent receivers 1040A, 1040B respectively to the decoder section 1080. The decoder section 1080 (also called a final processing stage) comprises a summer 1060, a soft decision data generator 794', a deinterleaver 1082 and a decoder 1100. The soft decision data generator 794' is connected to the summer 1060 and to the deinterleaver 1082. The deinterleaver 1082 is connected to the decoder 1100. The decoder 1100 is typically a Viterbi decoder. Implicit in the summer 1060 is a delay element applicable to each of its inputs, in this case the sets of energy levels 1042A, 1042B.

In operation, the energy levels 1042A, 1042B are carried from the modified coherent receivers 1040A, 1040B, respectively, to the summer 1060. The summer 1060 delays the energy levels 1042A, 1042B on a per-finger basis in order to align all the energy levels received from the various fingers. An example value for the total delay undergone by a given set of energy levels due to the multipath delay and the delay applied by the summer 1060 can be the maximum expected delay between multipath paths. The summer 1060 then adds together the suitably delayed energy levels 1042A and 1042B according to their associated orthogonal code (or index symbol) to create a group of combined energy values 1070.

The combined energy values 1070 are carried from the summer 1060 to the soft decision data generator 794'. The soft decision data generator 794' is identical to the soft decision data generator 794 shown in FIG. 6 and operates in exactly the same way. That is, the soft decision data generator 794' transforms the combined energy values 1070 into soft decision data 1075 typically using either a single-maxima metric generator 540 or a dual-maxima metric generator 610 shown in FIGS. 2 and 4, respectively.

The soft decision data 1075 is carried from the soft decision data generator 794' to the deinterleaver 1082. The deinterleaver 1082 is identical to the deinterleaver 550" shown in FIG. 6 and operates in exactly the same way. That is, the deinterleaver generates data symbols 1090 from the soft decision data 1075. The data symbols 1090 are carried from the deinterleaver 1090 to the decoder 1100, typically a Viterbi decoder. The decoder decodes the data symbols 1090 into traffic data bits 1110.

It will be appreciated that while FIG. 10 shows two fingers, more than two fingers may be used to further improve the bit error performance of the multi-stage receiver 1000.

Figure 11:
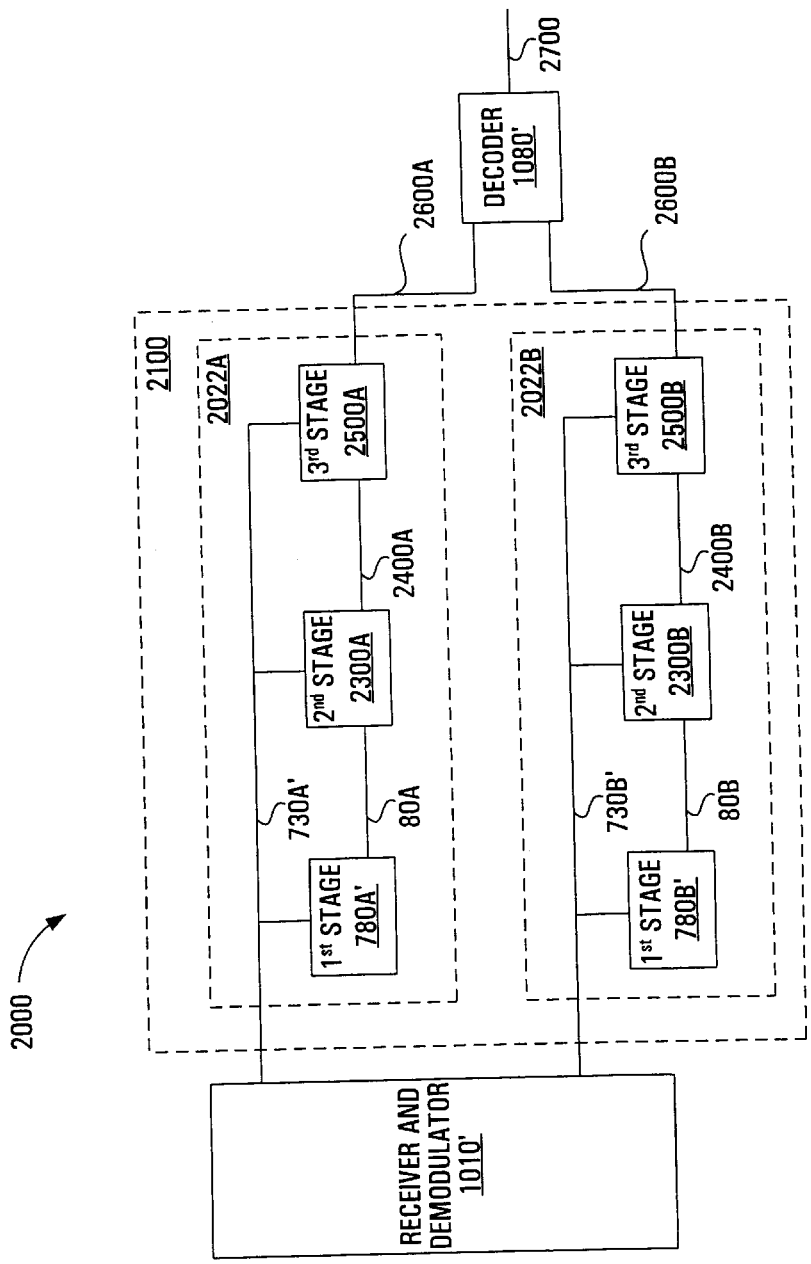
FIG. 11 is a block diagram of an improved multi-stage receiver using a rake receiver design in accordance with a fifth preferred embodiment of the present invention.

In accordance with a fifth embodiment of the present invention, and with reference to FIG. 11, there is provided a multi-stage receiver 2000. The multi-stage receiver 2000 comprises a receiver and demodulator section 1010', a detector section 2100, and a decoder section 1080'. The detector section 2100 is connected to the receiver and demodulator section 1010' and to the decoder section 1080'.

The receiver and demodulator section 1010' is identical to the receiver section 1010 shown in FIG. 10 and operates in exactly the same way. That is, the receiver and demodulator section 1010' provides sets of demodulated samples 730A' and 730B' to the detector section 2100.

The detector section 2100 comprises a first detector sub-section 2200A and a second detector sub-section 2200B. The first detector sub-section 2200A comprises a first processing stage 780A', a second processing stage 2300A and a third processing stage 2500A. The second processing stage 2300A is connected to the first processing stage 780A' and to the third processing stage 2500A. Similarly, the second detector sub-section 2200B comprises a first processing stage 780B', a second processing stage 2300B and a third processing stage 2500B. The second processing stage 2300B is connected to the first processing stage 780B' and to the third processing stage 2500B.

The demodulated samples 730A' and 730B' are carried to the first processing stage 780A' and to the first processing stage 780B' respectively. The first processing stages 780A' and 780B' are identical to the first processing stages 780A and 780B respectively found in the multi-stage receiver 1000 of FIG. 10 and operate in exactly the same way. That is, the first processing stages 780A' and 780B' generate traffic bits 80A and 80B as previously described.

The traffic bits 80A, 80B are carried from the first processing stages 780A', 780B' to the second processing stages 2300A, 2300B respectively. Each second processing stage 2300A and 2300B is identical to the second processing stage 800 in the multi-stage receiver 700 shown in FIG. 5 and operates in exactly the same way. That is, the second processing stages 2300A, 2300B generate traffic bits 2400A, 2400B, respectively. It is noted that unlike the second processing stages 1030A, 1030B in the multi-stage receiver 1000 shown in FIG. 10, the second processing stages 2300A and 2300B have coherent receivers with decoder sections.

The traffic bits 2400A, 2400B are carried from the second processing stages 2300A, 2300B to the third processing stages 2500A, 2500B, respectively. The third processing stages 2500A, 2500B are identical to the second processing stages 1030A, 1030B found in the multi-stage receiver 1000 shown in FIG. 10 and operate in exactly the same way. That is, the third processing stages 2500A, 2500B generate energy levels 2600A, 2600B. The energy levels 2600A and 2600B are carried to the decoder section 1080'. The decoder section 1080' (also called a final processing stage) is identical to the decoder section 1080 and operates in exactly the same way. That is, the decoder section 1080' generates traffic bits 2700.

In accordance with a sixth preferred embodiment of the present invention, the second processing stages 2300A and 2300B in the multi-stage receiver 2000 are replaced with modified second processing stages. In particular, each modified second processing stage is identical to the second processing stage 2300A or 2300B with the addition of a feedback loop and two switches.

Figure 12:
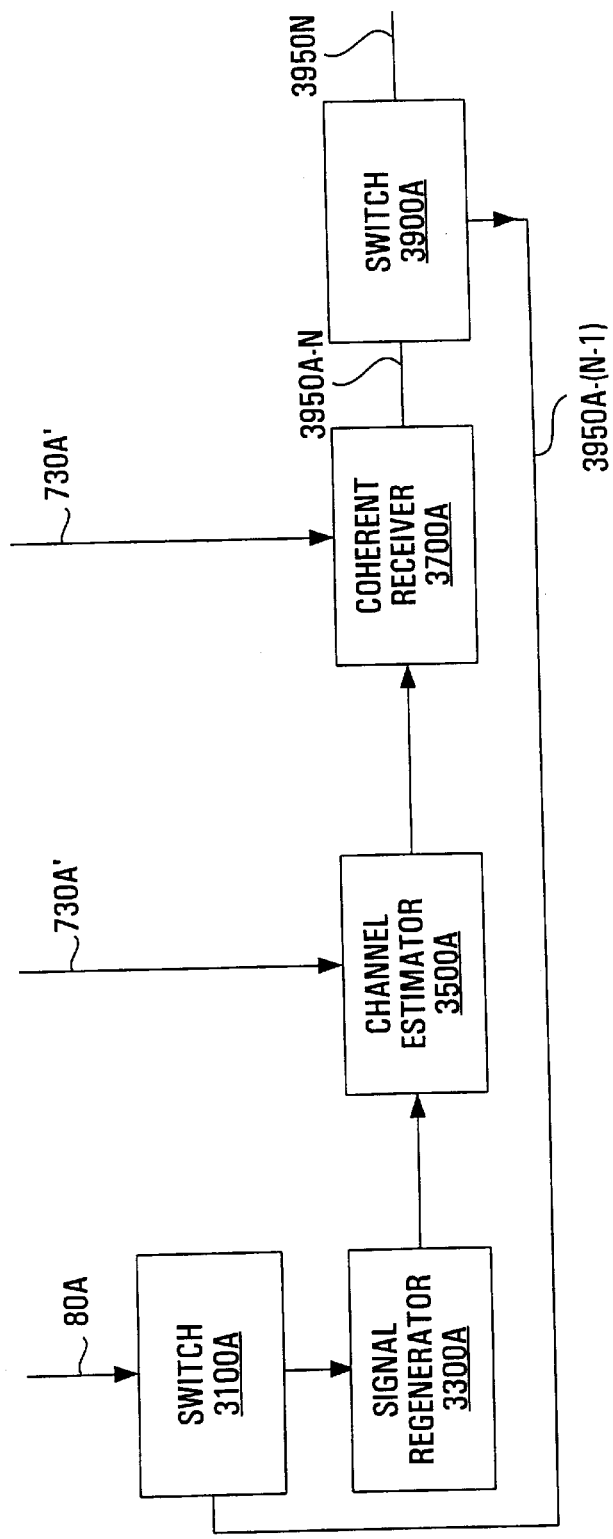
FIG. 12 is a block diagram of a second stage of an improved multi-stage receiver used in a sixth preferred embodiment of the present invention.

Referring in particular to FIG. 12, a modified second processing stage 3000A for the first finger is shown. The modified second processing stage 3000A comprises a first switch 3100A, a signal regenerator 3300A, a channel estimator 3500A, a coherent receiver 3700A and a second switch 3900A. As before, the channel estimator 3500A is connected to the signal regenerator 3300A and to the coherent receiver 3700A. The first switch 3100A is connected to the signal regenerator 3300A. However, the first processing stage (780A' m FIG. 11) is no longer directly connected to the signal regenerator 3300A but is now connected to the first switch 3100A. The first switch 3100A is identical to the switch 920 in the multi-stage receiver 901 shown in FIG. 9 and operates in exactly the same way.

The second switch 3900A is connected to the output of the coherent receiver 3900A. A feedback loop is connected between the second switch 3900A and the first switch 3100A.

In operation, the first switch 3100A initially allows the traffic bits 80A (i.e. a first estimate of the traffic signal) from passing through the first switch 3100A to the second processing stage 3000A. The signal regenerator 3300A, the channel estimator 3500A and the coherent receiver 3700A operate as previously described. That is, the coherent receiver generates traffic bits 3950A (which represents a second estimate of the digital traffic signal. The second switch 3900A passes the traffic bits 3950A to the first switch 3100A via the feedback loop. The second switch 3900A blocks the traffic bits 3950A from passing through to the third processing stage 2500A.

The first switch 3100A blocks the traffic bits 80A, from the first processing stage 780A' from entering the second processing stage 3000A and allows the traffic bits 3950A to pass into the signal regenerator 3300A. The signal regenerator 3300A, the channel estimator 3500A and the coherent receiver 3700A operate as previously described. That is, the coherent receiver generates traffic bits 3950B (i.e. a third estimate of the digital traffic signal). The traffic bits 3950B are either fed back into the input of the second processing stage 3000A for another iteration to generate still more traffic bits 3950C (i.e., a fourth estimate of the traffic signal) or are passed to the third processing stage 2500A. After N iterations, the second switch 3900A passes the traffic bits 3950N to the third processing stage 2500A (and prevents the traffic bits 3950N from being fed back into the input of the second processing stage 3000A). The third processing stage 2500A then generates a plurality of energy levels 2600A as previously described. The number N of iterations is typically 3 or 4.

The modified second processing stage for the second finger is identical to the modified second processing stage 3000A described above and operates in exactly the same way. The second finger also generates a plurality of energy levels 2600B.

Each plurality of energy levels 2600A, 2600B from the respective finger is then fed into the decoder section 1080'. The decoder section 1080' then generates yet another estimate of the digital traffic signal as previously described.

Yet another variation of the invention is possible. In accordance with a seventh preferred embodiment of the present invention, and with reference to FIG. 13, there is provided a multi-stage receiver 1300. The multi-stage receiver 1300 consists of a receiver and demodulator section 1010, a detector section 1320 and a decoder section 1380. The receiver and demodulator section 1010 is connected to the detector section 1320. The detector section 1320 is connected to the decoder section 1380.

The receiver and demodulator section 1010 is identical to its counterpart in FIG. 10 and therefore consists of an antenna 310''', a receiver 320'', two demodulators 410A, 410B and two block buffers 740A, 740B. The antenna 310''' is connected to the receiver 320''. The receiver 320'' is connected to the demodulators 410A, 410B. The demodulators 410A, 410B are connected to the block buffers 740A, 740B, respectively. As previously described, the receiver 320'' consists of a single receiver subsection although if more than one antenna 310''' is used, then multiple receiver subsections would be employed, one for each antenna 310'''.

In operation, the receiver subsection generates data samples 325A'', 325B'', which are carried to demodulators 410A, 410B, respectively. Also as previously described, demodulators 410A, 410B produce respective complex-valued digital signals comprising respective pluralities of demodulated samples 730A', 730B'. The demodulated samples 730A', 730B' are carried to the block buffers 740A, 740B, respectively where sets of demodulated samples 730A' and 730B' are buffered. Once block buffer 740A has a set of demodulated samples 730A', the set of demodulated samples is carried to the detector section 1320. Similarly, once block buffer 740B has a set of demodulated samples 730B', the set of demodulated samples is carried to the detector section 1320.

The detector section 1320 comprises a first detector sub-section 1322A, a second detector sub-section 1322B and a common detector sub-section 1322C. The first detector sub-section 1322A includes a first processing stage 1310A and a second processing stage 1350A. The two processing stages are interconnected via the common detector sub-section 1322C. The first processing stage 1310A of the first detector sub-section 1322A comprises a modified non-coherent receiver 1390A connected to the block buffer 740A. The second processing stage 1350A of the first detector sub-section 1322A comprises a channel estimator 830A connected to a modified coherent receiver 1040A. The channel estimator 830A and the modified coherent receiver 1040A are connected to the block buffer 740A.

Similarly, the second detector sub-section 1322B includes a first processing stage 1310B and a second processing stage 1350B. The two processing stages are interconnected via the common detector sub-section 1322C. The first processing stage 1310B comprises a modified non-coherent receiver 1390B connected to the block buffer 740B. The second processing stage 1350B comprises a channel estimator 830B connected to a modified coherent receiver 1040B. The channel estimator 830B and the modified coherent receiver 1040B are both connected to the block buffer 740B.

The common detector sub-section 1322C includes a summer 1330, a decision module 1332 and a signal regenerator 1334 connected in series. The summer 1330 is connected to the modified non-coherent receivers 1390A, 1390B and is equipped with delay elements for delaying each of its inputs for a specifiable duration. The decision module 1332 comprises a soft decision data generator, a deinterleaver and a decoder (e.g., a Viterbi decoder). The signal regenerator 1334 is identical to the signal regenerators 810A, 810B in FIG. 10 and accordingly comprises an encoder, an interleaver and a mapper. The signal regenerator 1334 feeds Walsh codes 1340 into the channel estimators 830A, 830B.

In operation, the demodulated samples 730A', 730B' respectively output by demodulators 410A, 410B are respectively carried to the modified non-coherent receivers 1390A, 1390B in the first processing stage of the first and second detector sub-sections, respectively. The modified non-coherent receivers 1390A, 1390B consist simply of Walsh transformer circuitry along with squaring and summing circuitry. Thus, the non-coherent receivers 1390A, 1390B output respective sets of energy values 1342A, 1342B from the respective demodulated samples 730A', 730B', which energy values are carried to the summer 1330 in the common detector sub-section 1322C.

The summer 1330 delays the energy levels 1342A, 1342B on a per-path basis in order to align all the energy levels received from the multiple (in this case, two) modified non-coherent receivers 1390A, 1390B. The summer 1330 then adds together the suitably delayed energy levels 1342A, 1342B according to their associated orthogonal code (or index symbol) to create a group of combined energy values 1336.

The combined energy values 1336 are carried from the summer 1330 to the decision module 1332. The soft decision data generator in the decision module 1332 transforms the combined energy values 1336 into soft decision data typically using either a single-maxima metric generator or a dual-maxima metric generator. The deinterleaver in the decision module 1332 then deinterleaves the soft decision data. Finally, the decoder in the decision module 1332 decodes the deinterleaved soft decision data into traffic data bits 1338 that are fed to the signal regenerator 1334.

The encoder within the signal regenerator 1334 encodes the traffic data bits 1338 using an algorithm identical to that used by the encoder in the transmitter. The interleaver in the signal regenerator 1334 then performs the inverse operations of those performed by the deinterleaver in the decision module 1332. Finally, the mapper in the signal regenerator 1334 produces Walsh codes 1340 from the encoded and interleaved traffic data bits.

The Walsh codes 1340 generated by the signal regenerator 1334 in the common detector sub-section 1322C are a first estimate of the sent signal s(k). This estimate is better than either of the estimates produced by the non-coherent receivers 790A, 790B of FIG. 10 because the energy in multiple paths has been constructively added by the summer 1330 prior to making a decision about the transmitted data.

The Walsh codes 1340 are carried from the signal regenerator 1334 to the channel estimators 830A, 830B. The channel estimators 830A, 830B are identical to those of FIG. 10 and operate in exactly the same way. That is, the channel estimators 830A, 830B generate respective samples 840A', 840B' from the Walsh codes 1340 and the respective demodulated samples 730A', 730B'. The samples 840A' generated by the first detector sub-section 1322A represent a first estimate of the channel information signal $g_A(k)$. Similarly, the samples 840B' generated by the second detector sub-section 1322B represent another first estimate of the information channel signal $g_B(k)$.

The samples 840A', 840B' are carried from the channel estimators 830A, 830B, respectively to the modified coherent receivers 1040A, 1040B, respectively. The modified coherent receivers 1040A, 1040B are identical to those of FIG. 10 and operate in exactly the same way, i.e., the modified coherent receivers 1040A, 1040B generate respective sets of energy levels 1042A, 1042B using respective sets of samples 840A', 840B' and respective sets of demodulated samples 730A', 730B'.

The energy levels 1042A, 1042B are carried from the modified coherent receivers 1040A, 1040B respectively to the decoder section 1380. The decoder processing stage 1380 comprises a summer 1360, a soft decision data generator 794', a deinterleaver 1082 and a decoder 1100. The soft decision data generator 794' is connected to the summer 1360 and to the deinterleaver 1082. The deinterleaver 1082 is connected to the decoder 1100. The decoder 1100 is typically a Viterbi decoder.

The decoder section 1380 is identical to the decoder section 1080 in FIG. 10 with the exception that the summer 1360 need not be equipped with delay elements. This is due to the fact that the summer 1330 in the common detector sub-section 1322C has already provided alignment of the signals corresponding to the various multipath paths.

In operation, the energy levels 1042A, 1042B are carried from the modified coherent receivers 1040A, 1040B, respectively, to the summer 1360. The summer 1360 then adds together the energy levels 1042A and 1042B according to their associated orthogonal code (or index symbol) to create a group of combined energy values 1070. The combined energy values 1070 are carried from the summer 1360 to the soft decision data generator 794'. The soft decision data generator 794' is identical to that of FIG. 10 and operates in exactly the same way. That is, the soft decision data generator 794' transforms the combined energy values 1070 into soft decision data 1075 typically using either a single-maxima metric generator 540 or a dual-maxima metric generator 610.

The soft decision data 1075 is carried from the soft decision data generator 794' to the deinterleaver 1082. The deinterleaver 1082 is identical to that of FIG. 10 and operates in exactly the same way. That is, the deinterleaver 1082 generates data symbols 1090 from the soft decision data 1075. The data symbols 1090 are carried from the deinterleaver 1082 to the decoder 1100, typically a Viterbi decoder. The decoder 1100 decodes the data symbols 1090 into traffic data bits 1110.

Figure 13:
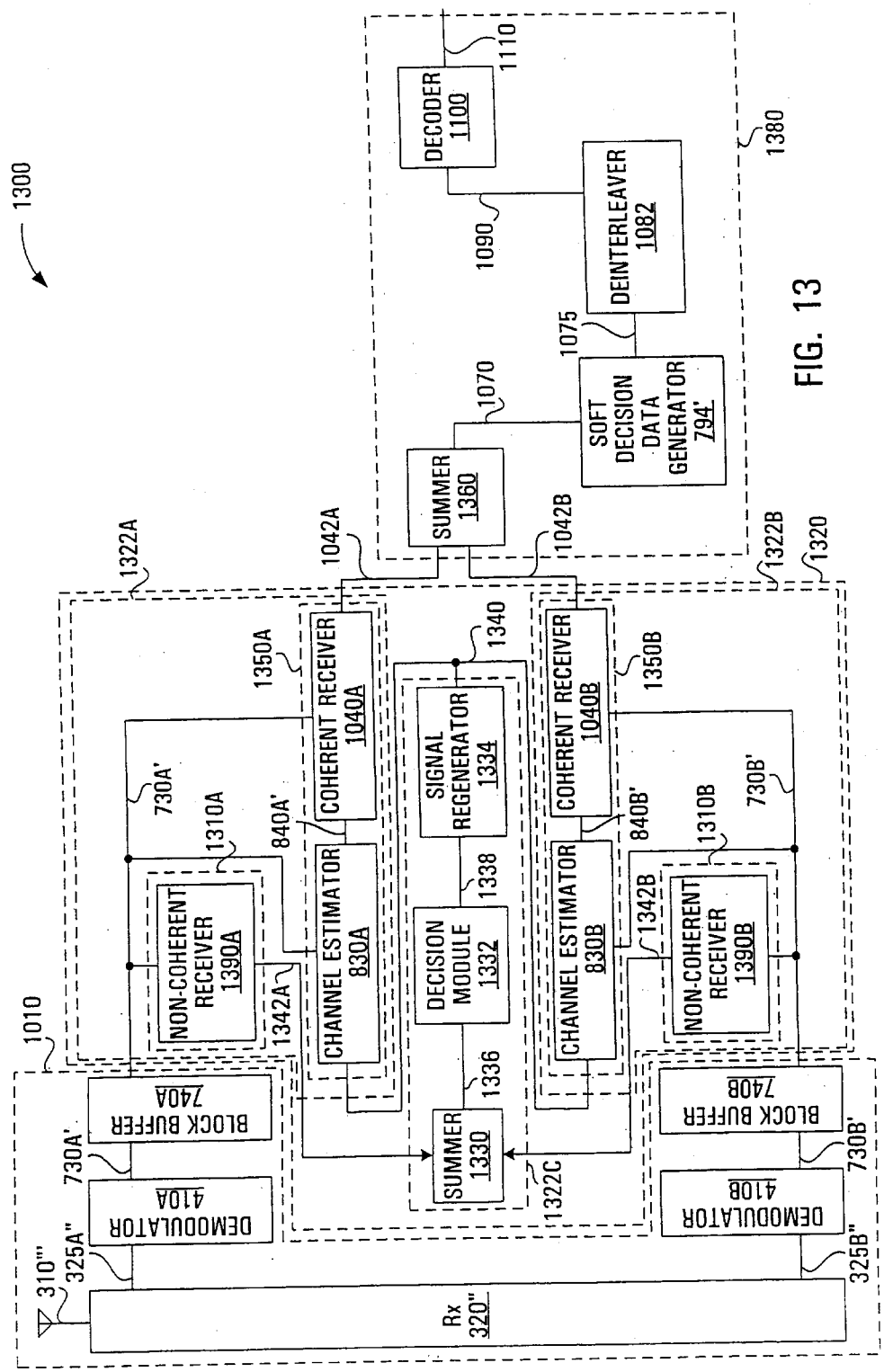
FIG. 13 is a block diagram of an improved multi-stage receiver using a rake receiver design in accordance with a seventh preferred embodiment of the present invention.

It will be appreciated that while FIG. 13 shows two fingers, more than two fingers may be used to further improve the bit error performance of the multi-stage receiver 1300.

Further variations of the present invention are possible. For example, in third generation CDMA, it is contemplated that the mobile stations will use transmitters that will send a pilot signal. The pilot signal will provide channel information relating to amplitude changes (i.e. fading) and phase changes to the receivers at the base station.

As a result, the non-coherent receivers 790A, 790B shown in the fourth embodiment of the present invention (FIG. 10) and the non-coherent receivers in the first processing stages 780A' and 780B' used in the fifth and sixth embodiments of the present invention (FIGS. 11, 12) would be replaced with coherent receivers. Similarly, the modified non-coherent receivers 1390A, 1390B in the seventh embodiment of the invention (FIG. 13) would be replaced by coherent counterparts.

The replacement coherent receivers would transform the demodulated samples 730A, 730B into either traffic bits or energy values, as appropriate, using coherent demodulation techniques known in the art.

Still another variation of the invention is possible. With reference to FIG. 10, the demodulators 410A, 410B in the receiver section 1010 used in the multi-stage receiver 1000 can be eliminated. The receiver 320" is simply connected to the block buffers 740A, 740B. The block buffers 740A, 740B buffer samples 325A", 325B" of the processed received signal from the receiver 320".

The non-coherent receivers 790A, 790B in the respective first processing stage 780A, 780B of the respective detector sub-section 1022A, 1022B of the detector section 1022 are further equipped with a respective demodulator which is identical to the respective demodulator 410A, 410B formerly in the receiver section 1010. Alternatively, if the respective first processing stage uses a coherent receiver, the coherent receiver in each first processing stage has a respective demodulator which is identical to the respective demodulator formerly in the receiver section 1010.

Furthermore, the respective second processing stage no longer uses a signal regenerator but uses a signal remodulator. The signal remodulators are the same as the signal regenerators 810A, 810B of FIG. 10 but also have a respective modulator connected to the output of the respective mapper.

In addition, the modified coherent receivers 1040A, 1040B in the respective second processing stage 1030A, 1030B of the respective detector sub-section 1022A, 1022B of the detector section 1020 are also equipped with a respective demodulator which is identical to the respective demodulator 410A, 410B formerly in the receiver section 1010.

Those skilled in the art will appreciate that similar modifications may be made to processing stages 780A', 2300A, 2500, 780B', 2300B, 2500B in FIG. 11, processing stage 3000A in FIG. 12 and processing stages 1322A, 1322B, 1322C in FIG. 13.

It should also be understood that the present invention is not limited to CDMA communications systems but may be used with any type of communications system, for example, (e.g. narrowband communications, TDMA, FDMA, etc. Furthermore, it should be noted that since the preferred embodiments use digital signals, the detector can be implemented using Digital Signal Processing (DSP) techniques.

In view of the many further variations of the present invention which may be conceived by one skilled in the art, the scope of the invention is only to be limited by the claims appended hereto.

We claim:

1. A multi-stage receiver for recovering a traffic signal embedded in samples of a received signal, comprising:
    a first detection stage capable of processing the samples of the received signal to provide a first estimate of the traffic signal; and
    a second detection stage connected to said first detection stage, said second detection stage capable of processing the samples of the received signal and the first estimate of the traffic signal to provide a second estimate of the traffic signal, the second estimate being better than the first estimate;
    said first detection stage comprising:
        a demodulator for demodulating the samples of the received signal; and
        a receiver for producing the first estimate of the traffic signal from the output of the demodulator;
    said second detection stage comprising:
        a remodulator for producing a remodulated sample stream from the first estimate of the traffic signal,
        a channel estimator for producing a channel estimate signal from the samples of the received signal and the remodulated sample stream;
        a second demodulator for demodulating the samples of the received signal; and
        a coherent receiver for producing the second estimate of the traffic signal from the channel estimate signal and the output of the second demodulator.

2. The multi-stage receiver defined in claim 1, further comprising a third detection stage connected to the second detection stage, said third detection stage capable of processing the samples of the received signal and the second estimate of the traffic signal to provide a third estimate of the traffic signal, the third estimate being better than the second estimate.

3. The multi-stage receiver defined in claim 2, wherein the third detection stage comprises:
    a second remodulator for producing a second remodulated sample stream from the second estimate of the traffic signal,
    a second channel estimator for producing a second channel estimate signal from the samples of the received signal and the second remodulated sample stream;
    a third demodulator for demodulating the samples of the received signal; and
    a second coherent receiver for producing the third estimate of the traffic signal from the second channel estimate signal and the output of the third demodulator.

4. A multi-stage receiver for recovering a traffic signal embedded in samples of a received signal, comprising:
    a first detection stage capable of processing the samples of the received signal to provide a first estimate of the traffic signal, said first detection stage having an input and an output; and
    a second detection stage connected to the said detection stage, said second detection stage capable of processing the samples of the received signal and the first estimate of the traffic signal to provide a second estimate of the traffic signal, the second estimate being better than the first estimate; said second detection stage having an input and an output, wherein the input of the second stage is connected to the output of the first stage;
    a switching unit for selectively connecting the output of the second detection stage to the input of the second detection stage, thereby to cause the output of the second detection stage to represent successively better estimates of the traffic signal.

5. The multi-stage receiver defined in claim 4, wherein the switching unit comprises a first selection unit at the input to the second stage and a second selection unit at the output of the second stage, the second selection unit providing the output of the second detection stage to the first selection unit.

6. A method of recovering a traffic signal embedded in samples of at least one received signal, comprising:
    processing the samples of the at least one received signal to provide a first estimate of the traffic signal;
    processing the samples of the at least one received signal and the first estimate of the traffic signal to provide a second estimate of the traffic signal, the second estimate being better than the first estimate; and
    processing the samples of the received signal and the second estimate of the traffic signal to provide a third estimate of the traffic signal, the third estimate being better than the second estimate;
    wherein processing the samples of the received signal and the first estimate of the traffic signal comprises:
        producing a regenerated signal from the first estimate of the traffic signal;
        producing a channel estimate signal from the samples of the received signal and the regenerated signal; and
        producing the second estimate of the traffic signal from the samples of the received signal and the channel estimate signal.

7. The method defined in claim 6, wherein processing the samples of the received signal and the second estimate of the traffic signal comprises:

producing a second regenerated signal from the second estimate of the traffic signal;

producing a second channel estimate signal from the samples of the received signal and the second regenerated signal; and producing the third estimate of the traffic signal from the samples of the received signal and the second channel estimate signal.

* * * * *